United States Patent
Partovi Nia et al.

(10) Patent No.: US 12,039,448 B2
(45) Date of Patent: Jul. 16, 2024

(54) SELECTIVE NEURAL NETWORK PRUNING BY MASKING FILTERS USING SCALING FACTORS

(71) Applicants: Vahid Partovi Nia, Montreal (CA); Ramchalam Kinattinkara Ramakrishnan, Montreal (CA); Eyyüb Hachmie Sari, Montreal (CA)

(72) Inventors: Vahid Partovi Nia, Montreal (CA); Ramchalam Kinattinkara Ramakrishnan, Montreal (CA); Eyyüb Hachmie Sari, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 874 days.

(21) Appl. No.: 17/012,818

(22) Filed: Sep. 4, 2020

(65) Prior Publication Data
US 2021/0073643 A1    Mar. 11, 2021

Related U.S. Application Data

(60) Provisional application No. 62/896,401, filed on Sep. 5, 2019.

(51) Int. Cl.
| | |
|---|---|
| G06N 3/08 | (2023.01) |
| G06N 3/04 | (2023.01) |
| G06N 3/082 | (2023.01) |

(52) U.S. Cl.
CPC .............. *G06N 3/082* (2013.01); *G06N 3/04* (2013.01)

(58) Field of Classification Search
None
See application file for complete search history.

(56) References Cited

U.S. PATENT DOCUMENTS

| | | |
|---|---|---|
| 2016/0019459 A1 | 1/2016 | Audhkhasi et al. |
| 2018/0096249 A1 | 4/2018 | Kim et al. |

(Continued)

OTHER PUBLICATIONS

Lin et al., Towards Optimal Structured CNN Pruning via Generative Adversarial Learning, arXiv:1903.09291v1 [cs.CV] Mar. 22, 2019, pp. 1-10 (Year: 2019).*

(Continued)

*Primary Examiner* — Alan Chen

(57) ABSTRACT

A method and system for pruning a neural network (NN) block of a neural network during training, wherein the NN block comprises: a convolution operation configured to convolve an input feature map with a plurality of filters, each filter including a plurality of weights, to generate a plurality of filter outputs each corresponding to a respective filter; an activation operation configured to generate, for each of the filter outputs, a respective non-linearized output; a scaling operation configured to scale the non-linearized output generated in respect of each filter by multiplying the non-linearized output with a mask function and a respective scaling factor that corresponds to the filter. During training: for each scaling factor corresponding to a filter, learning the scaling factor by minimizing loss of a loss function including a first regularization function with respect to the scaling factor; and if a value of the scaling factor satisfies a predetermined criterion, selectively pruning the filter corresponding to the scaling factor by masking the filter from the convolution operation.

17 Claims, 13 Drawing Sheets

(56) References Cited

U.S. PATENT DOCUMENTS

| | | |
|---|---|---|
| 2018/0165543 A1 | 6/2018 | Mody et al. |
| 2019/0066346 A1 | 2/2019 | Ye et al. |
| 2019/0095795 A1 | 3/2019 | Ren et al. |

OTHER PUBLICATIONS

He Kaiming [et al.] Deep Residual Learning for Image Recognition [Journal] // CoRR.—2015.—vol. abs/1512.03385.

He Kaiming [et al.] Delving deep into rectifiers: Surpassing human-level performance on imagenet classification [Conference] // Proceedings of the IEEE international conference on computer vision.—2015.

He Yang [et al.] Pruning Filter via Geometric Median for Deep Convolutional Neural Networks Acceleration [Journal] // CORR.—2018.—vol. abs/1811.00250.

He Yihui and Han Song ADC: Automated Deep Compression and Acceleration with Reinforcement Learning [Journal] // CoRR.—2018.—vol. abs/1802.03494.

Hebb Donald Olding The organization of behavior: A neuropsychological theory [Book].—[s.l.] : Wiley, 1949.

Hoffman Matthew D. Learning deep latent Gaussian models with Markov chain Monte Carlo [Conference] // International Conference on Machine Learning.—2017.

Hou Le [et al.] ConvNets with Smooth Adaptive Activation Functions for Regression [Conference] // Artificial Intelligence and Statistics.—2017.

Howard Andrew G. [et al.] Mobilenets: Efficient convolutional neural networks for mobile vision applications [Journal] // arXiv preprint arXiv:1704.04861.—2017.

Hsu Chi-Hung Chang Shu-Huan et al. MONAS: Multi-Objective Neural Architecture Search [Journal] // CoRR.—2018.—vol. arXiv:1806.10332.

Hsu Wilson, Kalra Agastya and Poupart Pascal Online Structure Learning for Sum-Product Networks with Gaussian Leaves [Journal] // arXiv preprint arXiv:1701.05265.—2017.

Yifan, Koren Yehuda and Volinsky Chris Collaborative filtering for implicit feedback datasets [Conference] // Data Mining, 2008. ICDM'08. Eighth IEEE International Conference on.—2008.

Yang Gao [et al.] CondenseNet: An Efficient DenseNet using Learned Group Convolutions [Journal] // arXiv preprint arXiv:1711.09224.—2017.

Huang Gao, Liu Zhuang and Weinberger Kilian Q. Densely Connected Convolutional Networks [Journal] // CoRR.—2016.—vol. abs/1608.06993.

Huang Minyi [et al.] Large population stochastic dynamic games: closed-loop McKean-Vlasov systems and the Nash certainty equivalence principle [Journal] // Communications in Information & Systems.—[s.l.] : International Press of Boston, 2006.—vol. 6.

Huang Minyi, Caines Peter E. and Malhame Roland P. Social optima in mean field LQG control: centralized and decentralized strategies [Journal] // IEEE Transactions on Automatic Control.—[s.l.] : IEEE, 2012.—vol. 57.

Huang Minyi, Malhame Roland P. and Caines Peter E. Computationally tractable stochastic power control laws in wireless communications [Journal] // IEEE Transactions on Automatic Control.—[s.l.] : IEEE, 2005.—vol. 50.

Hubara Itay [et al.] Binarized neural networks [Conference] // Advances in neural information processing systems.—2016.

Huynh Loc N., Lee Youngki and Balan Rajesh Krishna Deepmon: Mobile gpu-based deep learning framework for continuous vision applications [Conference] // Proceedings of the 15th Annual International Conference on Mobile Systems, Applications, and Services.—2017.

Huynh Loc Nguyen, Balan Rajesh Krishna and Lee Youngki Deepsense: A gpu-based deep convolutional neural network framework on commodity mobile devices [Conference] // Proceedings of the 2016 Workshop on Wearable Systems and Applications.—2016.

Jiang Yang [et al.] An Effective Training Method For Deep Convolutional Neural Network [Report] : unpublished.—2017.—http://arxiv.org/abs/1708.01666.

Jin Xiaojie [ et al.] Deep Learning with S-Shaped Rectified Linear Activation Units. [Conference] // AAAI.—2016.

Jordan Michael I. [et al.] An introduction to variational methods for graphical models [Journal] // Machine learning.—[s. .] : Springer, 1999.—vol. 37.

Joseph Redmon Santosh Divvala, Ross Girshick, and Ali Farhadi You only look once: Unified, real-time object detection. [Book].—[s.l.] : 2016 IEEE Conference on Computer Vision and Pattern Recognition (CVPR), 2016.

Kamilov Ulugbek S. and Mansour Hassan Learning optimal nonlinearities for iterative thresholding algorithms [Journal] // IEEE Signal Processing Letters.—[s.l.] : IEEE, 2016.—vol. 23.

Kim Yong-Deok [et al.] Compression of deep convolutional neural networks for fast and low power mobile applications [Journal] // arXiv preprint arXiv: 1511.06530.—201.

Kingma Diederik P. and Welling Max Auto-encoding variational bayes [Journal] // arXiv preprint arXiv:1312.6114.—2013.

Krizhevsky Alex, Nair Vinod and Hinton Geoffrey The CIFAR Datasets [Report] : unpublished.—2010.—https://www.cs.toronto.edu/ kriz/cifar.html.

Krizhevsky Alex, Sutskever Ilya and Hinton Geoffrey E. Imagenet classification with deep convolutional neural hetworks [Conference] // Advances in neural information processing systems.—2012.

Ane Nicholas [et al.] Dxtk: Enabling resource-efficient deep learning on mobile and embedded devices with the deepx toolkit [Conference] // Proceedings of the 8th EAI International Conference on Mobile Computing, Applications and Services, ser. MobiCASE.—2016.—vol. 16.

Ane Nicholas D. [et al.] An early resource characterization of deep learning on wearables, smartphones and internet-of-things devices [Conference] // Proceedings of the 2015 International Workshop on Internet of Things towards Applications.—2015.

Lane Nicholas D. [et al.] Deepx: A software accelerator for low-power deep learning inference on mobile devices [Conference] // Information Processing in Sensor Networks (IPSN), 2016 15th ACM/IEEE International Conference on.—2016.

Latifi Oskouei Seyyed Salar [et al.] Cnndroid: Gpu-accelerated execution of trained deep convolutional neural networks on android [Conference] // Proceedings of the 2016 ACM on Multimedia Conference.—2016.

LeCun Yann, Bengio Yoshua and Hinton Geoffrey Deep learning [Journal] // Nature.—[s.l.] : Nature Research, 2015.—vol. 521.

LeCun Yann, Cortes Corinna and Burges Christopher J. C. The MNIST Dataset of Handwritten Digits [Report] : unpublished.—1999.—http://yann.lecun.com/exdb/mnist/.

LeCun Yann, Denker John S. and Solla Sara A. Optimal Brain Damage [Book Section] // Advances in Neural Information Processing Systems 2 / ed. Touretzky D. S..—[s.l.] : Morgan-Kaufmann, 1990.

Li Dawei, Wang Xiaolong and Kong Deguang Deeprebirth: Accelerating deep neural network execution on mobile devices [Journal] // arXiv preprint arXiv: 1708.04728.—2017.

Li Hao [et al.] Pruning filters for efficient convnets [Journal] // arXiv preprint arXiv: 1608.08710.—2016.

Li Hao [et al.] Pruning Filters for Efficient ConvNets [Journal] // CoRR.—2016.—vol. abs/1608.08710.

Li Yingzhen and Gal Yarin Dropout Inference in Bayesian Neural Networks with Alpha-divergences [Journal] // arXiv preprint arXiv:1703.02914.—2017.

Li Yingzhen, Turner Richard E. and Liu Qiang Approximate Inference with Amortised MCMC [Journal] / arXiv preprint arXiv: 1702.08343.—2017.

Kafka P., Österreicher F. and Vincze I. On powers of f-divergences defining a distance [Journal] // Studia Scientiarum Mathematicarum Hungarica.—[s.l.] : Akadémiai Kiadó, 1991.—vol. 26.

Liu Han, Lafferty John and Wasserman Larry The nonparanormal: Semiparametric estimation of high dimensional undirected graphs [Journal] // Journal of Machine Learning Research.—2009.—vol. 10.

(56) References Cited

OTHER PUBLICATIONS

Liu Zhuang [et al.] Learning Efficient Convolutional Networks through Network Slimming [Journal] // CoRR.—2017.—vol. abs/1708.06519.
Lu Zhichao [et al.] NSGA-NET: Neural Architecture Search using Multi-Objective Genetic Algorithm [Journal] // CoRR.—2018.—vol. abs/1810.03522.
Luo Jian-Hao, Wu Jianxin and Lin Weiyao Thinet: A filter level pruning method for deep neural network compression [Journal] // arXiv preprint arXiv: 1707.06342.—2017.
MacKay David J. C. A practical Bayesian framework for backpropagation networks [Journal] // Neural computation.—[s.l.] : MIT Press, 1992.—vol. 4.
MacKay David J. C. Bayesian interpolation [Journal] // Neural computation.—[s.l.] : MIT Press, 1992. Vol. 4.
MacKay David J. C. Information-based objective functions for active data selection [Journal] // Neural computation.—[s.l.] : MIT Press, 1992.—vol. 4.
MacKay David J. C. The evidence framework applied to classification networks [Journal] // Neural computation.—[s.l.] : MIT Press, 1992.—vol. 4.
McCulloch Warren S. and Pitts Walter A logical calculus of the ideas immanent in nervous activity [Journal] // The bulletin of mathematical biophysics.—[s.l.] : Springer, 1943.—vol. 5.
Minka Thomas P. Expectation propagation for approximate Bayesian inference [Conference] // Proceedings of the Seventeenth conference on Uncertainty in artificial intelligence.—2001.
Mittal Deepak [et al.] Recovering from Random Pruning: On the Plasticity of Deep Convolutional Neural Networks [Journal] // CoRR.—2018.—vol. abs/1801.10447.
Mnih Andriy and Gregor Karol Neural variational inference and learning in belief networks [Journal] // arXiv preprint arXiv: 1402.0030.—2014.
Molchanov Pavlo [et al.] Pruning convolutional neural networks for resource efficient inference [Journal].—2016.
Molchanov Pavlo [et al.] Pruning Convolutional Neural Networks for Resource Efficient Transfer Learning [Journal] // CORR.—2016.—vol. abs/1611.06440.
Morris Carl N. Natural exponential families with quadratic variance functions [Journal] // The Annals of Statistics.—[s.l.] : JSTOR, 1982.
Neal Radford M. MCMC using Hamiltonian dynamics [Journal] // Handbook of Markov Chain Monte Carlo.—[s.l.] : CRC Press New York, NY, 2011.—vol. 2.
Nourian Mojtaba [et al.] Mean field (NCE) formulation of estimation based leader-follower collective dynamics [Journal] // International Journal of Robotics and Automation.—2011.—vol. 26.
Nowlan Steven J. and Hinton Geoffrey E. Simplifying neural networks by soft weight-sharing [Journal] // Neural computation.—[s.l.] : MIT Press, 1992.—vol. 4.
Oord Aäron [et al.] WaveNet: A Generative Model for Raw Audio [Conference] // 9th ISCA Speech Synthesis Workshop.—2016.
Österreicher Ferdinand and Vajda Igor A new class of metric divergences on probability spaces and its applicability in statistics [Journal] // Annals of the Institute of Statistical Mathematics.—[s.l.] : Springer, 2003.—vol. 55.
Papalambros Panos Y. and Wilde Douglass J. Principles of optimal design: modeling and computation [Book].—[s.l.] : Cambridge university press, 2000.
Pedersoli Fabrizio, Tzanetakis George and Tagliasacchi Andrea Espresso: Efficient Forward Propagation for BCNNs [Journal] // arXiv preprint arXiv: 1705.07175.—2017.
Pham Hieu [et al.] Efficient Neural Architecture Search via Parameter Sharing [Journal] // CoRR.—2018.—vol. abs/1802.03268.
Poon Hoifung and Domingos Pedro Sum-product networks: A new deep architecture [Conference] // Computer Vision Workshops (ICCV Workshops), 2011 IEEE International Conference on.—2011.
Qiao Siyuan [et al.] Neural Rejuvenation: Improving Deep Network Training by Enhancing Computational Resource Utilization [Journal] // arXiv preprint arXiv:1812.00481.—2018.
Rastegari Mohammad [et al.] Xnor-net: Imagenet classification using binary convolutional neural networks [Conference] // European Conference on Computer Vision.—2016.
Redmon Joseph [et al.] You only look once: Unified, real-time object detection [Conference] // Proceedings of the IEEE conference on computer vision and pattern recognition.—2016.
Rosenblatt Frank The perceptron: A probabilistic model for information storage and organization in the brain. [Journal] // Psychological review.—1958.—vol. 65.
Ross Girshick Jeff Donahue, Trevor Darrell, and Jitendra Malik Rich feature hierarchies for accurate object detection and semantic segmentation. [Book].—[s.l.] : IEEE Conference on Computer Vision and Pattern Recognition, Jun. 2014., 2014.
Saatchi Yunus and Wilson Andrew Gordon Bayesian GAN [Journal] // arXiv preprint arXiv:1705.09558.—2017.
Salimans Tim, Kingma Diederik and Welling Max Markov chain Monte Carlo and variational inference: Bridging the gap [Conference] // Proceedings of the 32nd International Conference on Machine Learning (ICML-15).—2015.
Sandler Mark [et al.] Inverted Residuals and Linear Bottlenecks: Mobile Networks for Classification, Detection and Segmentation [Journal] // arXiv preprint arXiv:1801.04381.—2018.
Zhang Xiangyu [et al.] Accelerating very deep convolutional networks for classification and detection [Journal] // IEEE transactions on pattern analysis and machine intelligence.—[s.l.] : IEEE, 2016.—vol. 38.
Zhang Xiangyu [et al.] Efficient and accurate approximations of nonlinear convolutional networks [Conference] // Proceedings of the IEEE Conference on Computer Vision and Pattern Recognition.—2015.
Zhang Xiangyu [et al.] Shufflenet: An extremely efficient convolutional neural network for mobile devices [Journal] // arXiv preprint arXiv:1707.01083.—2017.
Zhou Z. [et al.] Online Filter Clustering and Pruning for Efficient Convnets [Journal].—Jul. 2018.—vol. 00.
Zhu Jun [et al.] Big learning with Bayesian methods [Journal] // National Science Review.—[s.l.] : Oxford University Press, 2017.—p. nwx044.
Zhu Michael and Gupta Suyog To prune, or not to prune: exploring the efficacy of pruning for model compression [Journal] // arXiv preprint arXiv: 1710.01878.—2017.
Zhuang Zhuangwei [et al.] Discrimination-aware Channel Pruning for Deep Neural Networks [Journal] // CoRR.—2018.—vol. abs/1810.11809.
Zoph Barret [et al.] Learning transferable architectures for scalable image recognition [Journal] // arXiv preprint arXiv: 1707.07012.—2017.
Zoph Barret [et al.] Learning Transferable Architectures for Scalable Image Recognition [Journal] // CoRR.—2017.—vol. abs/1707.07012.
Zoph Barret and Le Quoc V. Neural Architecture Search with Reinforcement Learning [Journal] // CoRR.—2016.—vol. abs/1611.01578.
Zou Hui and Zhang Hao Helen on the adaptive elastic-net with a diverging number of parameters [Journal] // Annals of statistics.—[s.l.] : NIH Public Access, 2009.—vol. 37.
Wegenkittl Stefan A generalized φ-divergence for asymptotically multivariate normal models [Journal] // Journal of Multivariate Analysis.—[s.l.] : Elsevier, 2002.—vol. 83.
Scardapane Simone [et al.] Learning activation functions from data using cubic spline interpolation [Journal] // arXiv preprint arXiv:1605.05509.—2016.
Schwarz Gideon and others Estimating the dimension of a model [Journal] // The annals of statistics.—[s.l.] : Institute of Mathematical Statistics, 1978.—vol. 6.
Shaoqing Ren Kaiming He, Ross Girshick, and Jian Sun Faster r-cnn, towards real-time object detection with region proposal networks. [Book].—[s.l.] : IEEE Transactions on Pattern Analysis and Machine Intelligence,, 2017.

(56) References Cited

OTHER PUBLICATIONS

Sharma Sudhir and Chandra Pravin An Adaptive Sigmoidal Activation Function Cascading Neural Networks [Conference] // Soft Computing Models in Industrial and Environmental Applications, 6th International Conference SOCO 2011.—2011.
Shi Jiaxin [et al.] ZhuSuan: A Library for Bayesian Deep Learning [Journal] // arXiv preprint arXiv:1709.05870.—2017.
Smithson Sean C. [et al.] Neural Networks Designing Neural Networks: Multi-Objective Hyper-Parameter Optimization [Journal] // CoRR.—2016.—vol. abs/1611.02120.
Srinivas Suraj, Subramanya Akshayvarun and Babu R. Venkatesh Training Sparse Neural Networks [Journal] // CoRR.—2016.—vol. abs/1611.06694.
Srivastava Nitish [et al.] Dropout: a simple way to prevent neural networks from overfitting. [Journal] // Journal of machine learning research.—2014.—vol. 15.
Sun Yanan [et al.] Automatically Designing CNN Architectures Using Genetic Algorithm for Image Classification [Journal] // Neural and Evolutionary Computing.—2018.—vol. abs/1608.06993.
Suwajanakorn Supasorn, Seitz Steven M. and Kemelmacher-Shlizerman Ira Synthesizing obama: learning lip sync from audio [Journal] // ACM Transactions on Graphics (TOG).—[s.l.] : ACM, 2017.—vol. 36.
Tai Cheng [et al.] Convolutional neural networks with low-rank regularization [Journal] // arXiv preprint arXiv: 1511.06067.—2015.
Tibshirani Robert Regression shrinkage and selection via the lasso [Journal] // Journal of the Royal Statistical Society. Series B (Methodological).—[s.l.] : JSTOR, 1996.
Tilouche S., Nia V. Partovi and Bassetto Samuel Parallel coordinate order for high-diemsnional data [Report] : unpublished.—2017.—GERAD techical report G1738.
Titsias Michalis K. Learning Model Reparametrizations: Implicit Variational Inference by Fitting MCMC distributions [Journal] // arXiv preprint arXiv: 1708.01529.—2017.
Trottier Ludovic, Giguère Philippe and Chaib-draa Brahim Parametric Exponential Linear Unit for Deep Convolutional Neural Networks [Journal] // CoRR.—2016.—vol. abs/1605.09332.
Tulloch Andrew and Jia Yangqing High performance ultra-low-precision convolutions on mobile devices [Journal] // arXiv preprint arXiv:1712.02427.—2017.
Vaswani Ashish [et al.] Attention is all you need [Conference] // Advances in Neural Information Processing Systems.—2017.
Venieris Stylianos I. and Bouganis Christos-Savvas fpgaConvNet: A framework for mapping convolutional neural networks on FPGAs [Conference] // Field-Programmable Custom Computing Machines (FCCM), 2016 IEEE 24th Annual International Symposium on.—2016.
Wang Hao and Yeung Dit-Yan A Survey on Bayesian Deep Learning [Journal] // arXiv preprint arXiv: 1604.01662.—2016.
Wang Hao, Shi Xingjian and Yeung Dit-Yan Relational Stacked Denoising Autoencoder for Tag Recommendation. [Conference] // AAAI.—2015.
Wang Hao, Wang Naiyan and Yeung Dit-Yan Collaborative deep learning for recommender systems [Conference] // Proceedings of the 21th ACM SIGKDD International Conference on Knowledge Discovery and Data Mining.—2015.
Watter Manuel [et al.] Embed to control: A locally linear latent dynamics model for control from raw images [Conference] // Advances in neural information processing systems.—2015.
Wei Liu Dragomir Anguelov, Dumitru Erhan, Christian Szegedy, Scott E. Reed, Cheng-Yang Fu, and Alexander C. Berg. SSD: single shot multibox detector. [Book].—[s.l.] : CoRR, abs/1512.02325, 2015.
Welling Max and Teh Yee W. Bayesian learning via stochastic gradient Langevin dynamics [Conference] // Proceedings of the 28th International Conference on Machine Learning (ICML-11)—2011.
Wen Wei [et al.] Learning Structured Sparsity in Deep Neural Networks [Journal] // CoRR.—2016.—vol. abs/1608.03665.
Wu Jiaxiang [et al.] Quantized convolutional neural networks for mobile devices [Conference] // Proceedings of the IEEE Conference on Computer Vision and Pattern Recognition.—2016.
Wu Shuang [et al.] Training and Inference with Integers in Deep Neural Networks [Journal] // arXiv preprint arXiv:1802.04680.—2018.
Xu Bing [et al.] Empirical evaluation of rectified activations in convolutional network [Journal] // arXiv preprint arXiv:1505.00853.—2015.
Yamamoto Kohei and Maeno Kurato PCAS: Pruning Channels with Attention Statistics [Journal] // arXiv preprint arXiv:1806.05382.—2018.
Yang Haojin [et al.] BMXNet: An Open-Source Binary Neural Network Implementation Based on MXNet [Journal] // arXiv preprint arXiv:1705.09864.—2017.
Yang Tien-Ju [et al.] NetAdapt: Platform-Aware Neural Network Adaptation for Mobile Applications [Journal] // arXiv preprint arXiv:1804.03230.—2018.
Ye Jianbo [et al.] Rethinking the Smaller-Norm-Less-Informative Assumption in Channel Pruning of Convolution Layers [Journal] // CoRR.—2018.—vol. abs/1802.00124.
Yi Sun Ding Liang, Xiaogang Wang, and Xiaoou Tang Deepid3: Face recognition with very deep neural networks [Book].—[s.l.] : CoRR, abs/1502.00873, 2015.
Yi Sun Xiaogang Wang, and Xiaoou Tang Deep learning face representation by joint identification-verification [Book].—2014.
Yi Sun Xiaogang Wang, and Xiaoou Tang Deep learning face representation from predicting 10,000 classes. [Book].—[s.l.] : In Proceedings of the IEEE conference on computer vision and pattern recognition, 2014.
Yu Jiecao [et al.] Scalpel: Customizing DNN Pruning to the Underlying Hardware Parallelism [Journal] // SIGARCH Comput. Archit. News.—New York, NY, USA : ACM, Jun. 2017.—vol. 45, ISSN:0163-5964.
Agostinelli Forest [et al.] Learning activation functions to improve deep neural networks [Journal] // arXiv preprint arXiv: 1412.6830.—2014.
Alvarez Jose M. and Salzmann Mathieu Learning the Number of Neurons in Deep Networks [Journal] // CoRR.—2016.—vol. abs/1611.06321.
Anonymous Cumulative Saliency based Globally Balanced Filter Pruning For Efficient Convolutional Neural Networks [Journal].—2019.—under review.
Anwar Sajid, Hwang Kyuyeon and Sung Wonyong Structured Pruning of Deep Convolutional Neural Networks [Journal] // CoRR.—2015.—vol. abs/1512.08571.
Baker Bowen [et al.] Designing Neural Network Architectures using Reinforcement Learning [Journal] // CoRR.—2016.—vol. abs/1611.02167.
Bartoldson Brian, Barbu Adrian and Erlebacher Gordon Enhancing the Regularization Effect of Weight Pruning in Artificial Neural Networks [Journal].—May 2018.
Bécu Jean-Michel [et al.] Beyond support in two-stage variable selection [Journal] // Statistics and Computing.—[s.l.] : Springer, 2017.—vol. 27.
Belbahri Mouloud, et al Foothill: A Quasiconvex Regularization Function. [Book].—[s.l.] : arXiv preprint arXiv: 1901.06414, 2019.
Bhattacharya Sourav and Lane Nicholas D. Sparsification and separation of deep learning layers for constrained resource inference on wearables [Conference] // Proceedings of the 14th ACM Conference on Embedded Network Sensor Systems CD-ROM.—2016.
Blei David M., Ng Andrew Y. and Jordan Michael I. Latent dirichlet allocation [Journal] // Journal of machine Learning research.—2003.—vol. 3.
Breiman Leo Random forests [Journal] // Machine learning.—[s.l.] : Springer, 2001.—vol. 45.
Buntine Wray L. and Weigend Andreas S. Bayesian back-propagation [Journal] // Complex systems.—1991.—vol. 5.
Cai Zhaowei [et al.] Deep learning with low precision by half-wave Gaussian quantization [Journal] // arXiv preprint arXiv: 1702.00953.—2017.

(56) References Cited

OTHER PUBLICATIONS

Caines Peter E. Mean field games [Journal] // Encyclopedia of Systems and Control.—[s.l.] : Springer, 2014.

Candes Emmanuel and Tao Terence The Dantzig selector: Statistical estimation when p is much larger than n [Journal] // The Annals of Statistics.—[s.l.] : JSTOR, 2007.

Chen Tianqi, Fox Emily and Guestrin Carlos Stochastic gradient hamiltonian monte carlo [Conference] // International Conference on Machine Learning.—2014.

Cheng Yu [et al.] A Survey of Model Compression and Acceleration for Deep Neural Networks [Journal] // arXiv preprint arXiv:1710.09282.—2017.

Chin Ting-Wu, Zhang Cha and Marculescu Diana Layer-compensated Pruning for Resource-constrained Convolutional Neural Networks [Journal] // CoRR.—2018.—vol. abs/1810.00518.

Choi Yoojin, El-Khamy Mostafa and Lee Jungwon Towards the limit of network quantization [Journal] // arXiv preprint arXiv: 1612.01543.—2016.

Cohn David A. Neural network exploration using optimal experiment design [Conference] // Advances in neural Information processing systems.—1994.

Cohn David A., Ghahramani Zoubin and Jordan Michael I. Active learning with statistical models [Journal] // Journal of artificial intelligence research.—1996.

Courbariaux Matthieu, Bengio Yoshua and David Jean-Pierre Binaryconnect: Training deep neural networks with binary weights during propagations [Conference] // Advances in neural information processing systems.—2015.

Cressie Noel and Read Timothy R. C. Multinomial goodness-of-fit tests [Journal] // Journal of the Royal Statistical Society. Series B.—[s.l.] : JSTOR, 1984.

Darwiche Adnan A differential approach to inference in Bayesian networks [Journal] // Journal of the ACM (JACM).—[s.l.] : ACM, 2003.—vol. 50.

Efron Bradley [et al.] Least angle regression [Journal] // The Annals of statistics.—[s.l.] : Institute of Mathematical Statistics, 2004.—vol. 32.

Eisenach Carson, Wang Zhaoran and Liu Han Nonparametrically Learning Activation Functions in Deep Neural Nets [Journal].—2016.

Fan Jianqing and Li Runze Variable selection via nonconcave penalized likelihood and its oracle properties [Journal] // Journal of the American statistical Association.—[s.l.] : Taylor & Francis, 2001.—vol. 96.

Fan Jianqing and Lv Jinchi Sure independence screening for ultrahigh dimensional feature space [Journal] // Journal of the Royal Statistical Society: Series B.—[s.l.] : Wiley Online Library, 2008.—vol. 70.

Friedman Jerome, Hastie Trevor and Tibshirani Robert Sparse inverse covariance estimation with the graphical lasso [Journal] // Biostatistics. - [s.l.] : Oxford University Press, 2008. - vol. 9.

Gal Yarin and Ghahramani Zoubin Dropout as a Bayesian approximation: Representing model uncertainty in deep learning [Conference] // international conference on machine learning.—2016.

Gens Robert and Pedro Domingos Learning the structure of sum-product networks [Conference] // International Conference on Machine Learning.—2013.

Ghahramani Zoubin Probabilistic machine learning and artificial intelligence [Journal] // Nature.—[s.l.] : Nature Research, 2015.—vol. 521.

Girolami Mark and Calderhead Ben Riemann manifold langevin and hamiltonian monte carlo methods [Journal] // Journal of the Royal Statistical Society: Series B (Statistical Methodology).—[s.l.] : Wiley Online Library, 2011.—vol. 73.

Girshick Ross Fast r-cnn [Book].—[s.l.] : IEEE International Conference on Computer Vision (ICCV), Dec. 2015.

Gong Yunchao [et al.] Compressing deep convolutional networks using vector quantization [Journal] // arXiv preprint arXiv: 1412.6115.—2014.

Goodfellow Ian [et al.] Generative adversarial nets [Conference] // Advances in neural information processing systems.—2014.

Gudovskiy Denis A. and Rigazio Luca ShiftCNN: Generalized Low-Precision Architecture for Inference of Convolutional Neural Networks [Journal] // arXiv preprint arXiv: 1706.02393.—2017.

Guo Yiwen, Yao Anbang and Chen Yurong Dynamic Network Surgery for Efficient DNNs [Journal] // CoRR.—2016.—vol. abs/1608.04493.

Han Song [et al.] EIE: efficient inference engine on compressed deep neural network [Conference] // Computer Architecture (ISCA), 2016 ACM/IEEE 43rd Annual International Symposium on.—2016.

Han Song [et al.] EIE: Efficient Inference Engine on Compressed Deep Neural Network [Journal] // SIGARCH Comput. Archit. News.—New York, NY, USA : ACM, Jun. 2016.—vol. 44—ISSN: 0163-5964.

Han Song [et al.] Learning both weights and connections for efficient neural network [Conference] // Advances in neural information processing systems.—2015.

Han Song [et al.] Learning both Weights and Connections for Efficient Neural Networks [Journal] // CoRR.—2015.—vol. abs/1506.02626.

Han Song, Mao Huizi and Dally William J. Deep compression: Compressing deep neural networks with pruning, trained quantization and huffman coding [Journal] // arXiv preprint arXiv:1510.00149.—2015.

Hastie Trevor [et al.] Forward stagewise regression and the monotone lasso [Journal] // Electronic Journal of Statistics.—[s.l.] : The Institute of Mathematical Statistics and the Bernoulli Society, 2007.—vol. 1.

* cited by examiner

```
# Create a custom autograd Mask function
Input: alpha:= learnable scaling factor, t:=threshold
def Mask(alpha,t):
    forward():
        # Return either 0 or 1 based on the threshold value
        if(a>t) return 1
        else return 0
    backward():
        # Custom approximation function
```

FIG.6A

```
# Create custom ReLU function inheriting from nn.ReLU and scale the output.

Input: nb_epochs:=number of training epochs, m:=model, t:=threshold, mask:=Differentiable Mask Function,
oc:= number of output channels
class MaskReLU(Inherit from pytorch ReLU):
    forward():
        # Initialise alpha as parameter same size as number of filters.
        alpha = nn.parameter(torch.ones(oc))
        # Scale output of ReLU with alpha and Mask function in the forward propagation.
        return alpha * Mask(alpha,t) * ReLU(input)
```

FIG.6B

```
initialize:=L1_alpha:=0, L2_w:=0, L3_PR:=0
class CustomReg(nn.Module):
    # Calculate the regularization functions as shown in the document.
    forward():
        L1_alpha = 0
        foreach layer in m
            L1 = calculate(L1_alpha)
            L2 = calculate(L2_w)
            L3 = calculate(L3_PR)
        return L1 + L2 + L3
```

FIG.6C

```
input: nb_epochs:=number of training epochs, m:=model,t:=threshold,mask:=differentiable mask function
oc:= number of output channels
initialize:=count<-1, model_name:=m.name
# Create model with custom Relu function (MaskRelU).
call_create_model
call_create_regularization_function
for epoch from 0 to nb_epochs do
    call_forward_propagation()
    call_backward_propagation()
    call_update_parameters()
    call_optimizer()
    call_evaluate_model()
```

FIG.6D

SELECTIVE NEURAL NETWORK PRUNING BY MASKING FILTERS USING SCALING FACTORS

CROSS-REFERENCE TO RELATED APPLICATIONS

This application claims the benefit of and priority to U.S. Provisional Patent application No. 62/896,401 filed Sep. 5, 2019, the contents of which are incorporated herein by reference.

FIELD

This disclosure relates generally to artificial neural networks. More particularly, the present application relates to blocks for neural networks.

BACKGROUND

Artificial neural networks (NNs) are computing systems that are modeled on how biological brains operate. NNs are made up of a number of simple, highly interconnected processing elements, which process information by their dynamic response to external inputs. NNs can learn to perform inference tasks, such as object detection, image classification, clustering, voice recognition, or pattern recognition, by considering examples. NNs typically do not need to be programmed with any task-specific rules. Instead, NNs learn from the examples they process.

Convolutional neural networks (CNNs) are a sub-class of feed forward NNs that have distinct logical representations of computational layers optimized for inference tasks. The CNN has become a powerful tool for solving computer vision, natural language processing and pattern recognition inference tasks. To reach better accuracy, the design trend of NN architectures has been towards larger (e.g. deeper) and more complicated NNs. This has inevitably increased the number of operations performed during an inference task, to the point where NN systems can be costly to implement in software or hardware NN systems that increasingly rely on the use of specially designed, computationally powerful systems that employ one or more dedicated processing units, accelerators and supporting memory. In some examples, a dedicated processing unit, accelerator and supporting memory are packaged in a common integrated circuit. The computationally powerful systems required for deep NN systems come with increased financial cost, as well as ancillary costs in terms of physical space and thermal cooling requirements. Accordingly, there is a growing interest in NN compression techniques that may reduce the number of NN operations required for inference tasks and thereby enable NNs to be deployed in computationally constrained environments that may for example employ less powerful processing units, less powerful (or no) accelerators, and less memory than required for typical non-compressed NN systems. Computationally constrained environments may for example include the software and/or hardware environments provided by edge devices where memory, computation power and battery are limited. NN compression techniques may for example be applied in cost-effective computationally constrained devices, such as the edge devices, that can be implemented to solve real-world problems in applications such as robotics, autonomous driving, drones, and the internet of things (IOT).

A NN typically may include at least one NN block (e.g., a hidden NN layer) between an input and an output of the NN. The at least one block may for example include multiple operations such as convolution operations. FIG. 1A shows an example of a computational graph representation of a basic NN block 104 that may be used to implement a hidden layer 101 of an NN, and FIG. 1C presents a schematic diagram of a NN 100 that comprises a plurality of hidden layers 101. Each layer 101 includes a plurality of virtual neurons 102, with virtual synapses 103 interconnecting the layers. The NN 100 shown in FIG. 1C is fully connected in that each neuron 102 in each layer 101 receives the same set of inputs and is connected to all the neurons 102 in the successive layer. Layers 101 may be implemented using a respective NN block 104, with multiple successive NN blocks 104 interconnected to form NN 100.

In some examples, NN block 104 corresponds to a convolution layer in NN 100. In some cases, the NN 100 may include intermediate layers between NN blocks 100 such as pooling layers.

The NN block 104 of FIG. 1A includes a set of successive operations, including a matrix multiplication operation (Matmul), an addition operation (Add), and an activation operation (Activation a). Given the NN block 104 as shown in FIG. 1A is an i th block of the NN 100, output of the i th NN block of FIG. 1A can be mathematically represented by equation (1):

$$x^{i+1} = \sigma(W^i x^i + b^i) \quad (1)$$

where $x^i$ is a multidimensional vector (e.g., an 8, 16, 32, or 64 bit vector) that is an input to the i th NN block, $W^i$ is a weight matrix applied by the matrix multiplication operation (Matmul) of i th NN block and $b^i$ is a bias vector added to the output of the matrix multiplication operation (Matmul) by performing addition operation (Add). The activation function (Activation σ) implements a function $\sigma(x)$ that introduces non-linearity into iterative linear transformations which allows the NN 100 that incorporates the NN block 104 to approximate non-linear functions.

FIG. 1B is another example of an alternative architecture for an NN block 106 that can be used instead of NN block 104 to implement a layer 101 of NN 100. The NN block 106 of FIG. 1B is similar to NN block 104 of FIG. 1A, except that a batch normalization (BN) operation with a learnable bias β is used in place of the addition operation (Add) and bias vector $b^i$. The batch normalization (BN) operation of FIG. 1B improves training of a NN including the NN block of FIG. 1B over a NN that includes the NN block shown in FIG. 1A. Given the NN block of FIG. 1B is also an i th block, the batch normalization (BN) operation can be mathematically represented by equation (2):

$$BatchNorm(x) = \gamma \frac{x - \mu_B}{\sqrt{\sigma_B^2 + \epsilon}} + \beta \quad (2)$$

where $\mu_B$ is an mini-batch mean of x (a group or mini batch of inputs $x^i$), $\sigma_B$ is the mini-batch variance of mini-batch x, γ is a learnable scale, β is the learnable bias and ε is a very small number to avoid a Divide-By-Zero error. Output of the i th NN block 106 of FIG. 1B can be mathematically represented by equation (3):

$$x^{i+1} = \sigma(\text{BatchNorm}(W^i x^i))$$

$$W^i \in \mathbb{R}^{m \times n}, x^i \in \mathbb{R}^n, x^{i+1} \in \mathbb{R}^m \quad (3)$$

In some examples, the activation function a is implemented using Parametric rectified linear units (ReLUs), and the equation (3) is then denoted as the following function (4).

$$x^{i+1} = \text{ReLU}(\text{BatchNorm}(W^i x^i)) \qquad (4)$$

In some examples, for example in the case of a convolutional neural network (CNN), an element-by-element multiplication/convolution operation may be used to implement the matrix multiplication operation (Matmul). In that case, the component $W^i x^i$ in equations (1), (3), and (4) of the above discussion may be replaced with $\text{Conv}(W^i x^i)$. For ease of illustration, $\text{Conv}(W^i x^i)$ will be used to represent an output of a convolution operation in following discussion.

NNs used for performing inference tasks, for example tasks including image classification and machine translations, may have tens of millions of weights and require billions of floating-point operations to make a prediction for a single input sample. Sparsity has emerged as a leading approach to address these challenges. Sparsity is referred to as a property of a NN wherein a subset of parameters (e.g., weights) of the NN have a value of exactly zero. In particular, sparsity can expressed as a proportion NN weights that are zero valued. With zero valued weights, multiplications (which dominate neural network computation) can be skipped, and the trained NN can be stored and transmitted compactly using sparse matrices. Sparsity has been leveraged to significantly reduce computational costs associated with the deployment of the NNs (e.g., deep neural networks) and to enable deployment of state-of-the-art NNs in resource constrained environments.

Sparsity can be obtained by pruning (i.e. setting weights to zero), which effectively reduces the number of virtual neurons and synapses that are included in an NN. Although a number of different approaches have been proposed to prune weights from NNs to induce sparsity, the resulting NNs suffer from deficiencies in respect of either one or more of computational power and accuracy of inference performance.

Accordingly, it is desirable to design a NN block where weights can be pruned significantly, in order to reduce one or more of computational cost and memory requirements associated with the NN block but still enable accurate inference performance.

SUMMARY

The present disclosure describes a neural network (NN) block including a scaling operation that is configured to scale output of an activation operation by using a scaling factor that is learnable and a mask function whose value is determined by the learnable scaling factor. Each filter is associated with a learnable scaling factor. The scaling factor is trained in backward pass by a regularization function included in a loss function. When a scaling factor is learned to have a value to enable the mask function to be zero, a plurality of weights constituting a filter corresponding to the learned scaling factor will be selected to be pruned or removed from the NN block. Such a configuration may help to provide structural sparsity to a NN including the NN block and to reduce computational cost significantly in resource constrained environments. In some examples, the neural network (NN) block of the present disclosure may be used in various different applications, such as performing an inference task, including facial recognition, object detections, image classification, machine translation, or text-to-speech transition.

According to a first example aspect is a method of pruning a neural network (NN) block of a neural network during training of the neural network. The NN block comprises: a convolution operation configured to convolve an input feature map with a plurality of filters, each filter including a plurality of weights, to generate a plurality of filter outputs each corresponding to a respective filter; an activation operation configured to generate, for each of the filter outputs, a respective non-linearized output; and a scaling operation configured to scale the non-linearized output generated in respect of each filter by multiplying the non-linearized output with a mask function and a respective scaling factor that corresponds to the filter. The method comprises: for each scaling factor corresponding to a filter, learning the scaling factor by minimizing loss of a loss function including a first regularization function with respect to the scaling factor; and if a value of the scaling factor satisfies a predetermined criterion, selectively pruning the filter corresponding to the scaling factor by removing the filter from the convolution operation.

In embodiments of the first example aspect, during backpropagation a differentiable function approximating the mask function is used to compute gradients of the loss function for updating the scaling factor during training.

In embodiments of one or more of the preceding aspects, for each scaling factor corresponding to a filter, the loss function includes a second regularization function with respect to weights of the filter; and during backpropagation, the second regularization function is configured to learn the weights to enable the loss function to be minimized.

In embodiments of one or more of the preceding aspects, the loss function includes a third regularization function with respect to a current pruning ratio; and during backpropagation, the third regularization function is configured to learn the current pruning ratio to approximate to a desired pruning ratio to enable the loss function to be minimized.

In embodiments of one or more of the preceding aspects, each of the first, second and third regularization functions includes a respective hyperparameter that controls a respective influence of the regularization parameter on the loss function.

In embodiments of one or more of the preceding aspects, the predetermined criterion includes an absolute value of the trained scaling factor being less than or equal to a threshold.

In embodiments of one or more of the preceding aspects, the plurality of filter outputs corresponding to each respective filter collectively form an activation map that corresponds to an output channel of the NN block.

In embodiments of one or more of the preceding aspects, the mask function is an indication function that is equal to 0 when the scaling factor is outside of a threshold range and 1 when the scaling factor is within a threshold range.

In embodiments of one or more of the preceding aspects, the method comprises outputting, at the end of the training, a set of weights for the NN block that excludes the weights of the pruned filters for use by an inference NN block that does not include a scaling operation.

In embodiments of one or more of the preceding aspects, the NN block corresponds to a layer of a convolution NN.

According to another example aspect is a method for pruning a neural network (NN) during training the neural network, wherein the NN comprises: one or more NN blocks each configured to receive an input and generate an output, each NN block being associated with a scaling factor; and for each NN block, a scaling operation configured to scale the NN block output by multiplying the output with the scaling factor and a mask function that is based on the scaling factor. The method comprises: learning the scaling factor for each NN block by minimizing loss of a loss function including a first regularization function with respect to the scaling factor; and if a value of the trained scaling factor satisfies a predetermined criterion, pruning the NN block associated with the scaling factor.

According to a further example aspect is a system that includes a processing device and a non-transitory memory or storage storing instructions that configure the processing device to train a neural network to learn parameters for a neural network (NN) block that comprises: a convolution operation configured to convolve an input feature map with each of a plurality of filters, each filter including a respective plurality of weights, to generate a plurality of filter outputs each corresponding to a respective filter; an activation operation configured to generate, for each of the filter outputs, a respective non-linearized output; and a scaling operation configured to scale the non-linearized output generated in respect of each filter by multiplying the non-linearized output with a mask function and a respective scaling factor that corresponds to the filter. The instructions include instructions that configure the processing device to: for each scaling factor corresponding to a filter, learn the scaling factor by minimizing loss of a loss function that includes a first regularization function for the scaling factor; and when a value of the scaling factor satisfies a predetermined criterion, selectively prune the filter corresponding to the scaling factor by masking the filter from the convolution operation.

According to a further example aspect is a computer readable memory that persistently stores instructions that configure a processing device to train a neural network to learn parameters for a neural network (NN) block that comprises: a convolution operation configured to convolve an input feature map with each of a plurality of filters, each filter including a respective plurality of weights, to generate a plurality of filter outputs each corresponding to a respective filter; an activation operation configured to generate, for each of the filter outputs, a respective non-linearized output; and a scaling operation configured to scale the non-linearized output generated in respect of each filter by multiplying the non-linearized output with a mask function and a respective scaling factor that corresponds to the filter. The instructions include instructions that configure the processing device to: for each scaling factor corresponding to a filter, learn the scaling factor by minimizing loss of a loss function that includes a first regularization function for the scaling factor; and when a value of the scaling factor satisfies a predetermined criterion, selectively prune the filter corresponding to the scaling factor by masking the filter from the convolution operation.

According to a further example aspect is a method for pruning one or more neural network sub-networks of a neural network (NN) during training of the neural network, wherein the NN comprises: one or more NN sub-networks each configured to receive an input and generate an output, each NN sub-network being associated with a scaling factor; and for each NN sub-network, a scaling operation configured to scale the NN sub-network block output by multiplying the output with the scaling factor and a mask function that is based on the scaling factor. The method includes: learning the scaling factor for each NN sub-network minimizing loss of a loss function including a first regularization function with respect to the scaling factor; and when a value of the trained scaling factor satisfies a predetermined criterion, masking the NN sub-network associated with the scaling factor from the NN.

BRIEF DESCRIPTION OF THE DRAWINGS

Reference will now be made, by way of example, to the accompanying drawings which show example embodiments of the present application, and in which:

FIGS. 6A-6D present pseudo codes representing respective operations of the NN block of FIG. 2;

Similar reference numerals may have been used in different figures to denote similar components.

DESCRIPTION OF EXAMPLE EMBODIMENTS

Figure 1B:
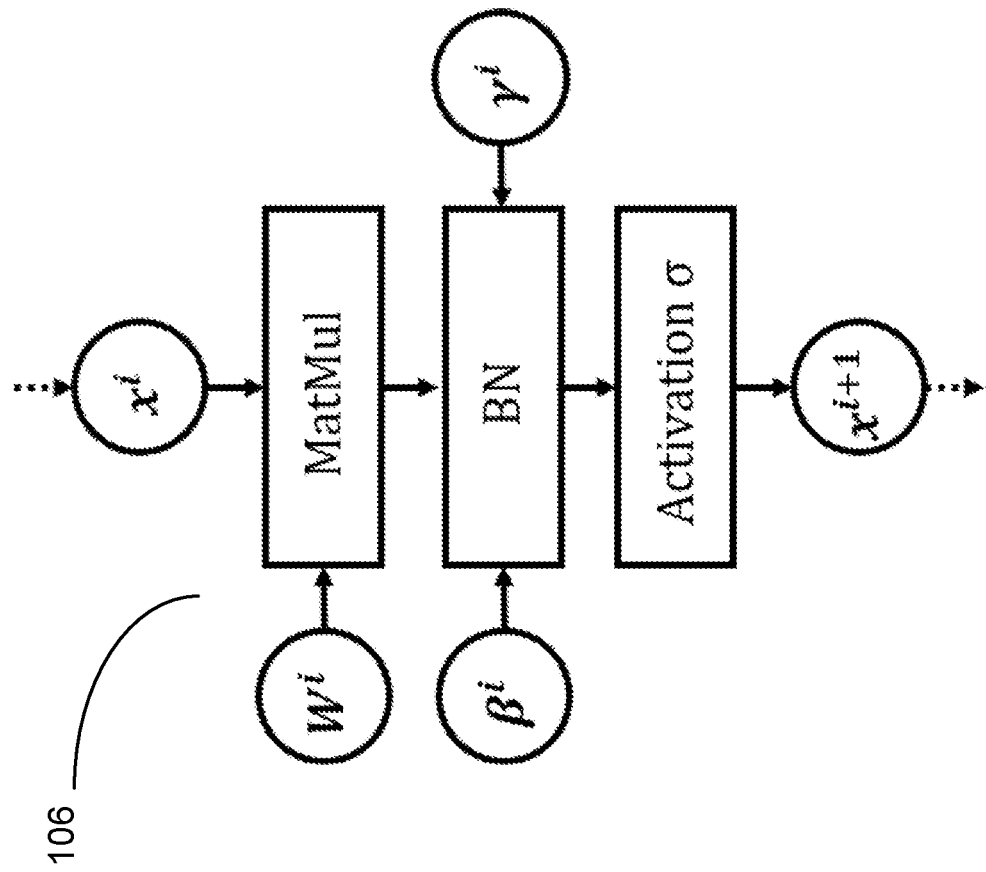
FIG. 1B is another computational graph representation of a known NN block.
Figure 1A:
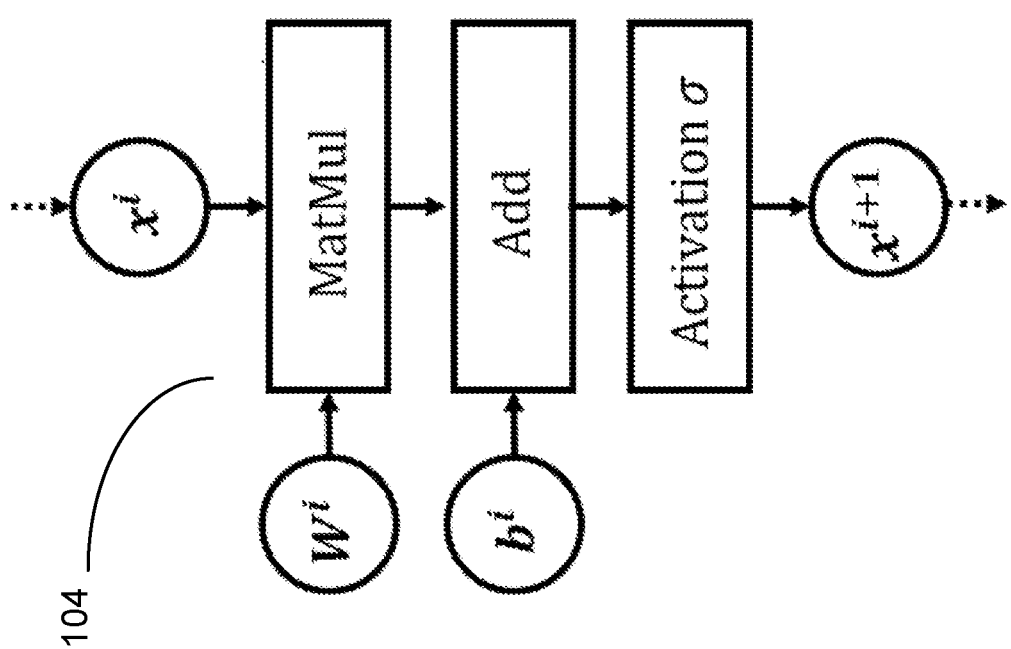
FIG. 1A is a computational graph representation of a known NN block for implementing a layer of an NN.
Figure 1C:
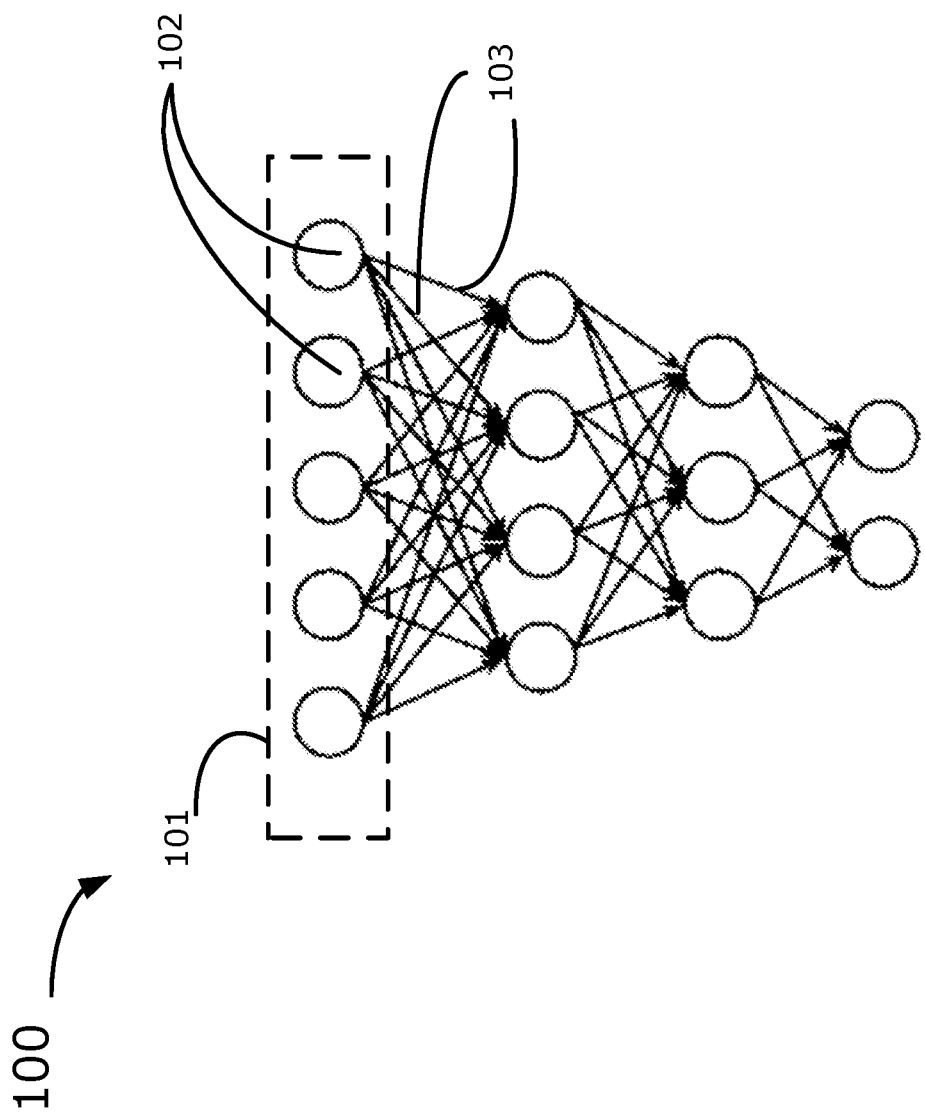
FIG. 1C is a schematic diagram of a known NN structure.

The present disclosure is directed to a neural network (NN) block of a NN where weights are pruned when the NN is being trained, which may provide structural sparsity to the trained NN block. In some examples, the structural sparsity resulting from by pruning may yield substantial savings in the amount of memory required for storage and/or operation of a trained NN that is implemented using the pruned NN blocks. In at least some configurations, the disclosed NN block may result in an NN that requires less computational power and/or less memory resources. In some examples, the NN block may effectively operate in computationally constrained environments such as those found in edge devices.

Various pruning techniques to introduce sparsity are currently used to remove weights, connections, and/or neurons from one or more NN blocks, in order to generate a compressed NN to perform an inference task, including image classification, machine translation, and/or text-to-speech.

A conventional method, called magnitude-based weight pruning, as disclosed in Han, et al., 2015, (citation provided below) is to remove those weights having lowest magnitudes from NN blocks after training the NN blocks has been completed (post-training). Such a method to prune weights from a NN is achieved by removing unimportant weights that have low contribution to the NN. However, unstructured sparsity (e.g., unstructured weight matrices) may be introduced into the NN structure. Memory may be required to store and make use of the unstructured weight matrices, which may be a challenge for parallel processing, among other things. Moreover, some low-magnitude weights that are pruned may have correlations with other non-pruned weights, leading to less accuracy for inference performance.

Another approach, known as Network Slimming (disclosed in Liu, et al., 2017 (citation provided below)), provides L1 regularization on scaling factors in a BN operation, in order to identify outputs that are insignificant and push the scaling factors applied in the BN operation to zero. However, such a method to prune weights is performed post-training.

Another method called Scalpel (discussed in Yu, et al., 2017 (citation provided below)) prunes nodes that are below a threshold value using a mask function and based on hardware capabilities of Single instruction, multiple data (SIMD) architecture. Such a method to prune weights uses a fixed threshold and a non-differentiable function in a post-training process. L1 Norm is used as a saliency score for pruning filters to obtain a relatively important filter from a respective convolution operation by calculating a sum of absolute weights in the filter or the L1 Norm. However, such a method may fail to provide best generalization capabilities. Thus, accuracy of performing inference tasks by using such conventional approaches drops drastically. Moreover, as the conventional pruning techniques use a pre-trained NN (e.g., a NN has already been trained), filters including weights are pruned in post-training process, multiple iterations of pruning and training to tune parameters (e.g., weights) in the NN are required, which may require a large number of computational resources and memory capacity.

In example embodiments, the present disclosure describes a NN block in which some filters are selectively pruned by using a trainable scaling factor while the NN block and the scaling factor are being trained. Such a method may enable the NN block to learn how to update/train the scaling factors and to select filters for pruning during NN block training. Furthermore, pruning filters from the NN block may be performed in one single iteration with more flexibility. In example embodiments, the disclosed NN block applies a differentiable mask function in place of a non-differentiable mask function to train or update the scaling factors and weights associated with filters of the NN block during backward propagation. Such a solution may allow a NN including one or more pruned NN blocks disclosed herein to be loaded and implemented into a high-speed cache of a processing unit when an inference task is performed. This may permit high speed operations to be performed by processing units having limited computational power (e.g. micro-controllers used in resource constrained devices such as IoT devices and mobile devices) and limited memory storage.

Figure 2A:
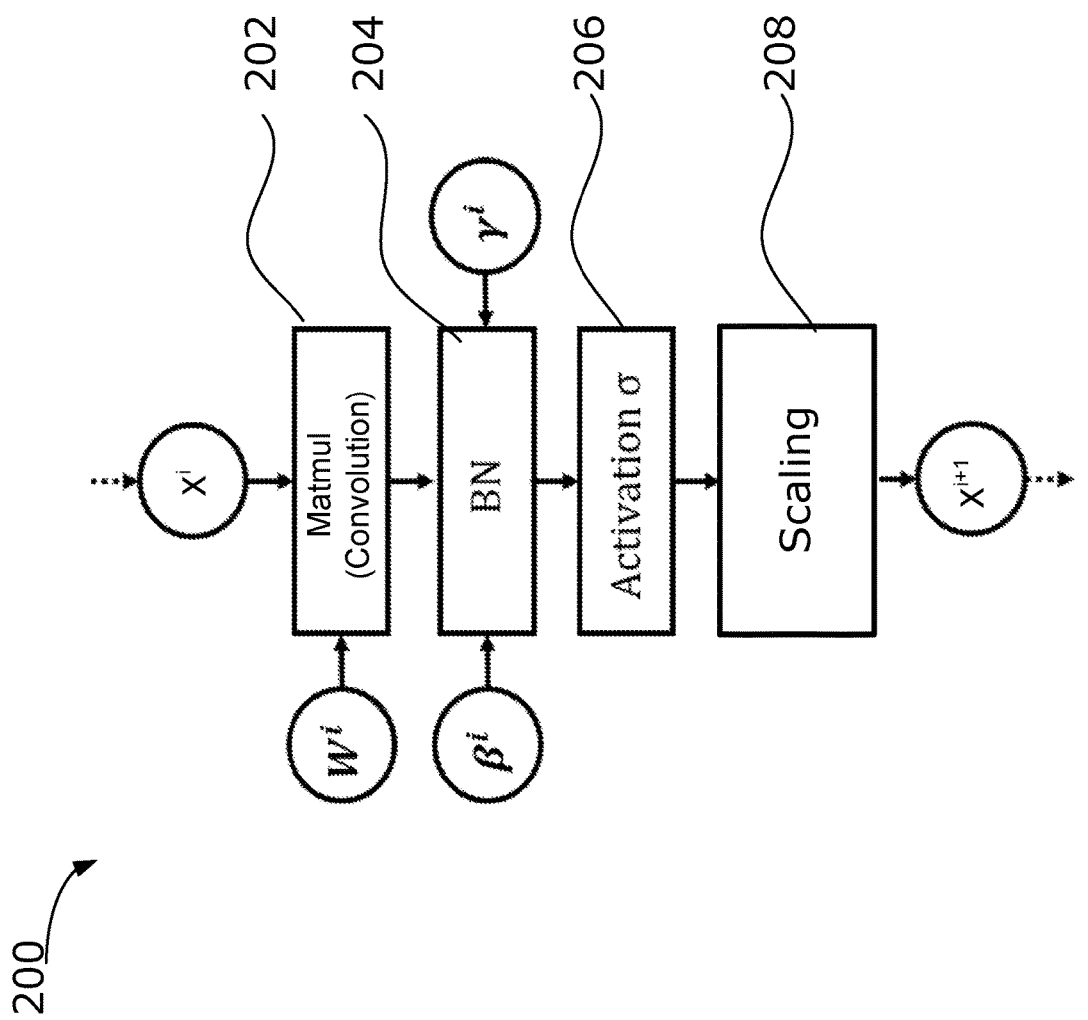
FIG. 2A is a computational graph representation of an CNN block according to an example embodiment.
Figure 2B:
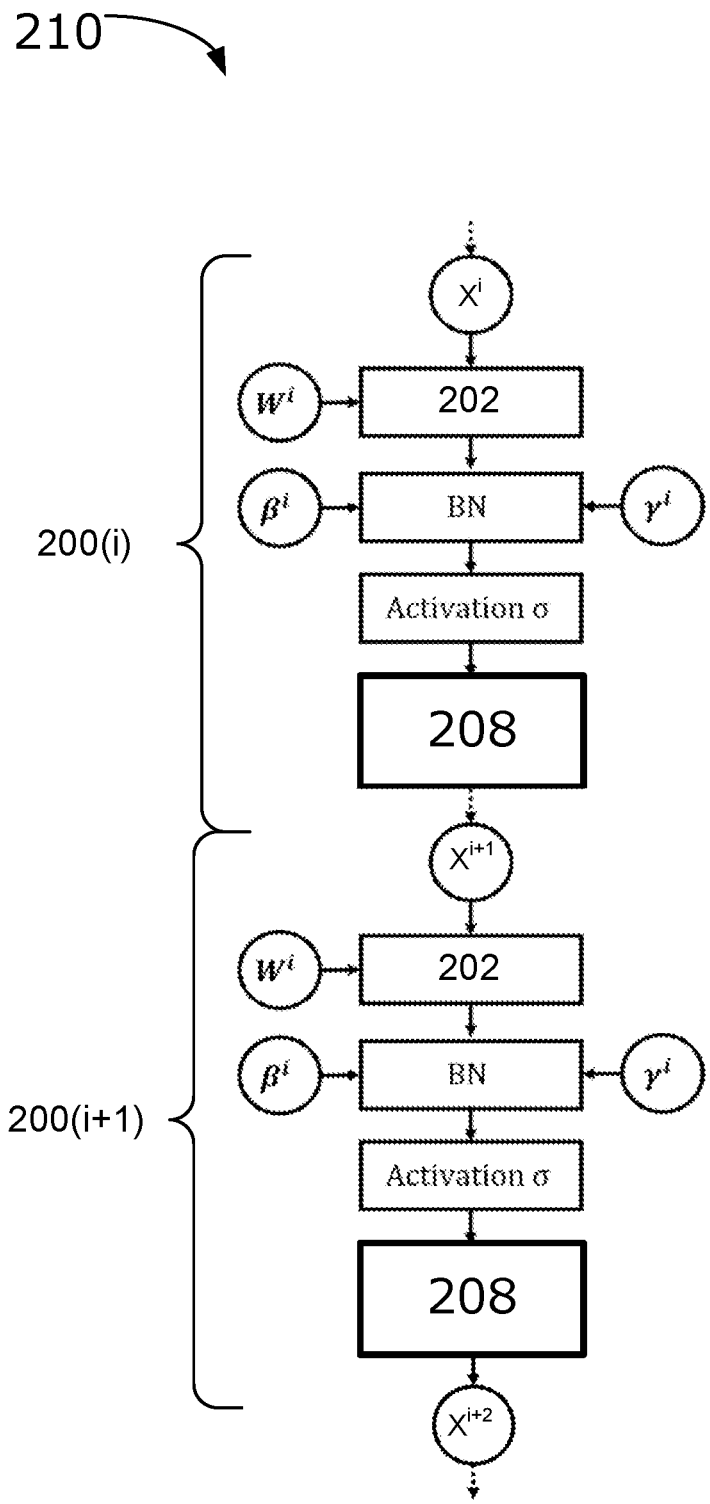
FIG. 2B is a schematic diagram of a CNN including the CNN block of FIG. 2A.
Figure 2C:
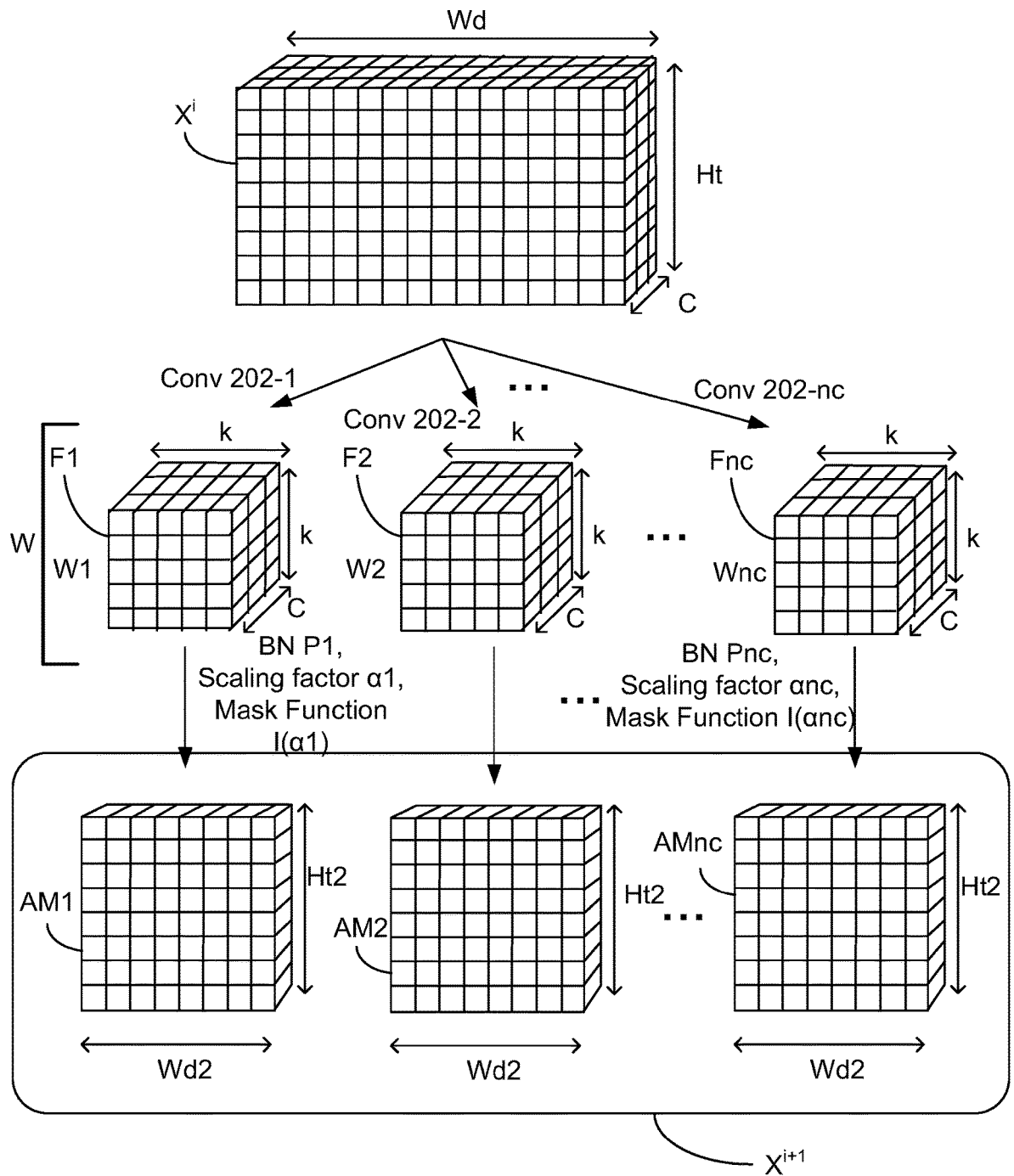
FIG. 2C is a graphic illustration of a CNN layer, including the CNN block of FIG. 2A.

FIG. 2A is a computational graph representation of an i th NN block $200(i)$ (generically referred to as NN block 200) according to an example embodiment. In some examples, the NN block 200 may be a convolutional neural network (CNN) block that forms an $i^{th}$ layer of an NN 210 (FIG. 2B) that is a CNN 210 (FIG. 2B). FIG. 2C is a schematic diagram illustrating operation of CNN block 200 of FIG. 2A in the context of a CNN. Similar to the NN block 106 of FIG. 1B, the CNN block 200 includes a set of successive operations which are performed to implement a layer of the NN 210, including at least one matrix multiplication (Matmul) operation (embedded in a a convolution operation in the case of a CNN)) 202, a batch normalization (BN) operation 204, and an activation operation 206. In the case of a CNN, the convolution operation 202 of CNN block 200 will typically represent a set of parallel convolution operations that are each performed in respect of input feature map $X^i$, with each parallel convolution operation using a respective filter (e.g., set of weights) to generate a respective activation feature map that forms a respective channel of output feature map $X^{i+1}$. Unlike NN block 106, CNN block 200 also includes a scaling operation 208. For each convolution operation, the matrix multiplication/convolution operation 202, BN operation 204, and the activation operation 206 may function in a similar manner to the counterpart operations of the NN block of FIG. 1B. In the case where NN block 200 is a CNN block, the matrix multiplication operation 202 is represented by a convolution function (denoted by Conv( ) and the activation operation 206 is implemented using ReLU functions, an output feature map of the activation operation 206 can be represented by the equation (5):

Output of the activation operation 206=ReLU
(BatchNorm(Conv($W^i x^i$))) (5)

For ease of illustration, in the example shown in FIG. 2A, given there is only one block i (i.e., only one CNN layer) and therefore i is equal to 1, the equation (5) will be simplified as the following equation (5a) in which superscripts of W and X are removed:

Output of the activation operation 206=ReLU
(BatchNorm(Conv($WX$))) (5a)

In example embodiments, the weight matrix W applied by convolution operation 202 effectively configures the convolution operation 202 to function as a plurality of filters. In example embodiments, the weight matrix W and convolution operation 202 shown in FIG. 2A and equations 5 and 5a are implemented as a set of parallel convolution operations configured to function as a plurality of filters, each of which corresponds to a respective output channel. FIG. 2C graphically illustrates block 2A in the case where CNN block 200 implements a set of nc parallel convolution operations 202-1 to 202-nc, each of which applies a respective filter F1 to Fnc that is defined by a respective set W1 to Wnc of weights. Each filter F1 to FcN includes a respective set of learnable weights W1 to Wnc, which collectively are represented in equations 5 and 5A as the weight matrix W. In the following description, "j" is used to denote a generic output channel, where 1≤n≤c. Referring to FIG. 2C, in the example of an image, the input feature map $x^i$ to NN block 200 is a Wd×Hd×C feature map, with C being the number of input channels, Wd the width of the feature map input and Ht the height of the feature map (in some examples Wd=Ht). In this regard, for a given filter F1 to Fnc, the input (e.g. filter field of view) is a 3D tensor of size k×k×C, with k being the kernel size. During training of block 200, each respective filter Fj is convolved, using a defined stride length, over the input feature map $x^i$ by taking a respective portion of size k×k×C from the input feature map $x^i$ and multiplying it by the filter Fj (e.g. the set of k×k×C filter weights Wj) in an element-wise manner. All the values output from the filter Fj for a respective portion of size k×k×C are summed to get one scalar at the end, and the filter is convolved over C×k×k portions of the input tensor using a defined stride to generate a output feature map FMj of scaler values. In the illustrated example, output feature map FMj is a Wd2× Ht2×1 activation map AMj, which is subjected at batch normalization, activation and scaling operations. The activation maps AM1 to AMnc collectively form a Wd2×Ht2×nc output feature map for CNN block 200.

The goal of filter pruning is to remove all the weights corresponding to a particular filter Fj. In example embodiments, filters can be pruned during training such that at the inference stage the trained CNN block 200 can be implemented with fewer filters, thereby potentially speeding up inference. For example, in the case of a CNN block 200 having nc=512 filters, pruning 2 of the filters during training will allow the trained block to be implemented with nc=510 filters without having to implement or change source code. As will be explained in greater detail below, when a mask function $I(\alpha^j)=0$, the j-th filter Fj can be removed; in particular, the weights (e.g., Wj) corresponding to the j-th filter Fj can be removed from the weight matrix W.

Thus, the NN block 200 may include one or more convolution operations (e.g., cony 202-1 to cony 202-nc), each associated with a respective filter F1 to Fnc. Each filter Fj includes a plurality of weights Wj. For example, if a filter Fj has a format of 3*3*3, the filter Fj includes 27 weights. For illustrative purpose, one single convolution operation 202-J from the CNN block 200 will be used to demonstrate how to select filters to prune from the filters F1 to Fnc associated with the convolution operation 202 from the CNN block 200.

After the batch normalization operation BN 204 and activation operation 206 are performed to generate a plurality of non-linearized outputs (e.g., matrices that correspond to activation maps AM1 to AMnc), the scaling operation 208 of the CNN block 200 scales each output (e.g. each output channel j) of the activation operation 206 by multiplying the output j with a scaling factor $\alpha^j$ and a mask function $I(\alpha^j)$. Output activation map AMj of the CNN block 200 for the scaling operation 208 is mathematically denoted by equation (6):

$$AMj \text{ output of CNN block } 200 = I(\alpha^j)*\alpha^j*\text{ReLU}(\text{BatchNorm}(\text{Conv}(Wx^i))) \quad (6)$$

Where $\alpha^j$ is a scaling factor for a j th output of the activation operation 206 (e.g., activation map AMj) and the scaling factor is trainable/learnable; $\alpha j \in \mathbb{R}^{out}$ (in some examples, $\alpha^j$ may be a vector); $I(\alpha^j)$ represents the mask function, which is defined by an indication function as disclosed in the following equation (7):

$$I(\alpha^j) = \begin{cases} 1 & |\alpha^j| > t \\ 0 & \text{Otherwise} \end{cases} \quad (7)$$

Where t represents a threshold value that approximates to 0, for example, in some embodiments t is in a range from $10^{-6}$ to $10^{-4}$; the threshold value t may be predefined or predetermined.

The mask function $I(\alpha^j)$ is a function whose value is determined by the scaling factor $\alpha^j$. Thus, as the scaling factor $\alpha^j$ is varied or trained to be updated, a value of the mask function $I(\alpha^j)$ is changed accordingly. The scaling factor $\alpha^j$ is trained by a first regularization function included in a loss function during backpropagation, as will be discussed further below.

Figure 3A:
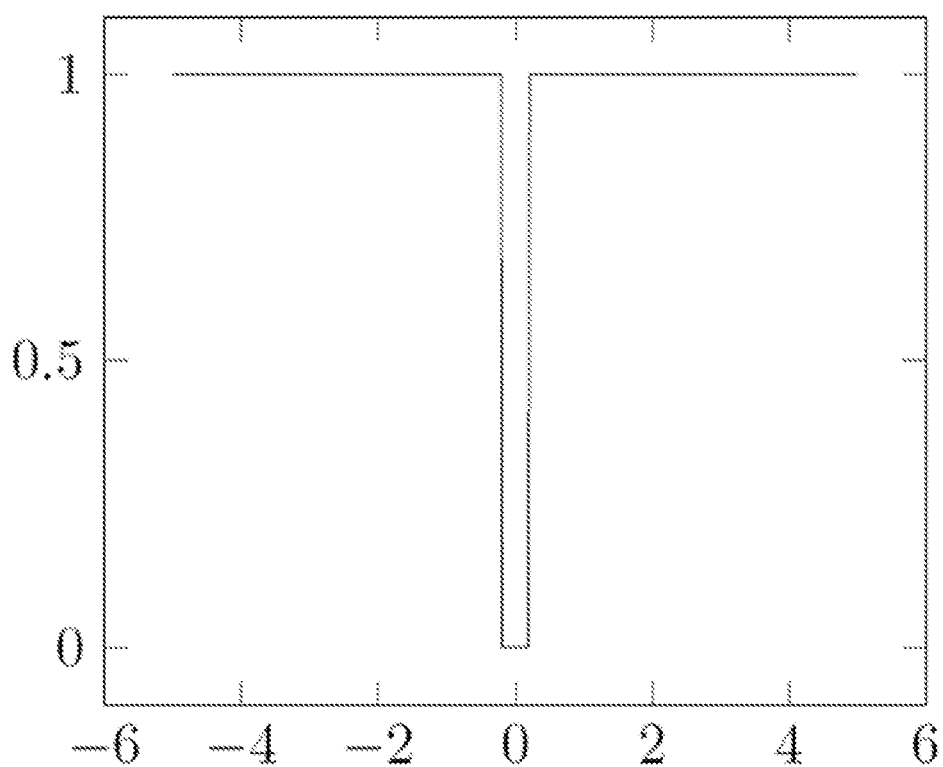
FIG. 3A graphically represents a mask function in a two dimensional coordinate plot.

FIG. 3A shows a graph of one example of a mask function (7). In accordance with the equations (6) and (7) and the graph as shown in FIG. 3A, while the scaling factor $\alpha^j$ can be trained to have an absolute value that is greater than the threshold value t (e.g., approximating $10^{-6}$ to $10^{-4}$), the mask function $I(\alpha^j)$ equals to 1. The equation (6) will be simplified as the following equation (6a):

$$AMj \text{ output of the NN block } 200 = \alpha^j*\text{ReLU}(\text{BatchNorm}(\text{Conv}(WX))) \quad (6a)$$

While the absolute value of the scaling factor $\alpha^j$ is less than or equal to the threshold value t (e.g., approximating $10^{-6}$ to $10^{-4}$), the mask function $I(\alpha^j)$ equals to 0, therefore the equation (6) representing the $j^{th}$ channel output of the NN block 200 equals to 0. Accordingly, any filter Fj that corresponds to a scaling factor $\alpha^j$ that can be trained to enable the equation (6) to equal to 0 will be selected to be pruned from the NN block 200 by removing the set of weights Wj corresponding to the selected filter Fj from the NN block 200.

Accordingly, scaling operation 208 applies a different scaling factor $\alpha^j$ to each of the respective filters Fj implemented by convolution operation 202. In this regard, $\alpha^j$ is a scaling factor that corresponds to a j th filter Fj that is used to generate the j th output of the convolution operation 202 that is then provided to activation operation 206. The resulting $j^{th}$ output of the activation operation is provided to a respective scaling factor $\alpha^j$. If the scaling factor $\alpha^j$ is trained in backward pass to have a value to enable the mask function (7) to equal to 0, the corresponding j th filter Fj will be selected, and the set Wj of weights constituting the j th filter will be removed from the NN block 200. Such a process of pruning filters from a NN block 200 is called "filter pruning". It will be noted that the effect of removing a filter Fj is that the parallel convolution operation Conv202-j that is used to implement the filter no longer needs to be performed, thus simplifying the trained inference CNN model that includes CNN block 200. During training of the NN that includes CNN block 200, filter pruning is effectively carried out by masking the filter from the convolution operation 202, which simulates the removal of the set of weights that corresponds to the filter. The mask (e.g., "0" value) is generated by the mask function based on the learned scaling factor $\alpha^j$. Once training is completed, the weights (e.g., Wj) that correspond to any masked filters (e.g., Fj) can be removed from the block weights W.

Accordingly, if a learned scaling factor $\alpha^j$ can have a range between −t to t inclusive (i.e., $|\alpha^j| \le t$), the mask function will be set to 0, and the corresponding j th filter Fj will be selected to be pruned from the NN block 200. Learning the scaling factor $\alpha^j$ to have a value between −t to t inclusive will now be described in detail. A first regularization function (L1) with respect to the scaling factor $\alpha^j$ is incorporated into a loss function, denoted by L(w, $\alpha^j$), of the NN block 200 to learn the scaling factor $\alpha^j$ in backward pass. The first regularization function (L1) is defined by equation (8):

$$L_1(\alpha^j) = \lambda_1 |\alpha^j|_1 \quad (8)$$

where $\lambda_1$ is a parameter that control importance of the L1 regularization function within the loss function.

Although a range between −t to t (inclusive −t and t) is set to enable the mask function $I(\alpha^j)$ to be zero, this is only illustrative and is not intended to be limiting. In other examples, the range that enables the mask function $I(\alpha^j)$ to be zero may be any other suitable criterion in accordance to requirement of pruning accuracy or inference task.

During backwards propagation, in order to minimize loss, a gradient of the loss function L(w, $\alpha^j$) of the NN block 200 is computed. In some examples, a gradient descent optimization algorithm is used to implement backpropagation in the backward pass. Using the gradient descent optimization algorithm, the scaling factor $\alpha^j$ is learned to be within the range −t to t inclusive help to find a minimum loss of the loss function including L1 regularization. Accordingly, the loss function including L1 regularization is optimized to achieve a minimum value. Such a scaling factor $\alpha^j$ within the range −t to t inclusive can enable the mask function $I(\alpha^j)$ (7) to be zero, which causes the scaling operation to be zero accordingly. Thus, j th filter Fj corresponding to such a scaling factor $\alpha^j$ will be selected and the set Wj of weights that define the j th filter Fj will be pruned.

Figure 3B:
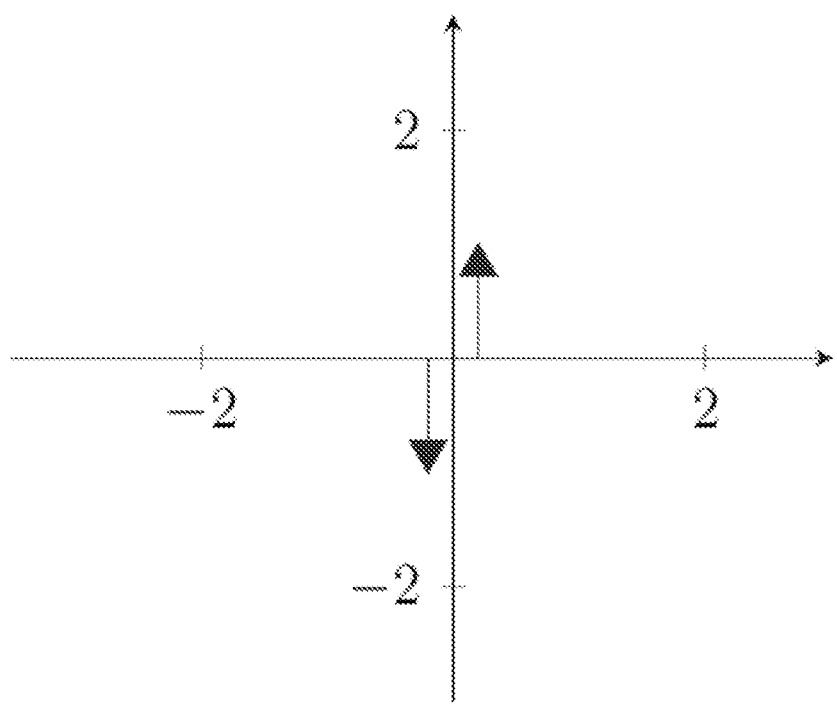
FIG. 3B graphically represents derivatives of the mask function of FIG. 3A.

FIG. 3B demonstrates a derivative of the mask function (7). As shown in FIGS. 3A and 3B, the mask function (7) is not differentiable at values where al equals to t and $\alpha^j$ equals to −t. In addition, except at values where $\alpha^j$ equals to t and $\alpha^j$ equals to −t, gradients of the mask function (7) remain to be 0 because values of the mask function (7) are constant (e.g., 0 or 1). The non-differentiable points and zero valued gradient may cause the backpropagation to be performed inaccurately, which may lead to inaccurate or incorrectly trained scaling factors and weights. Accordingly, in some example embodiments, a differentiable mask function (9), as discussed below, is used to substitute for the mask function (7) to approximate derivative of the mask function (7) when performing backpropagation during training of the NN block 200, in order to update the scaling factors $\alpha^j$ to $\alpha^{nc}$ accurately. The differentiable mask function (9) is defined as below:

$$f(x, \beta) = \alpha \tanh\left(\frac{\beta x}{2}\right) + \frac{1}{2}\alpha\beta x \text{sech}^2\left(\frac{\beta x}{2}\right) \quad (9)$$

Where $\alpha$ is a shape parameter (i.e., not scaling factor $\alpha^j$) and $\beta$ is a scale parameter; tan h(.) is a hyperbolic tangent function, and sec h(.) is a hyperbolic secant function.

Figure 4A:
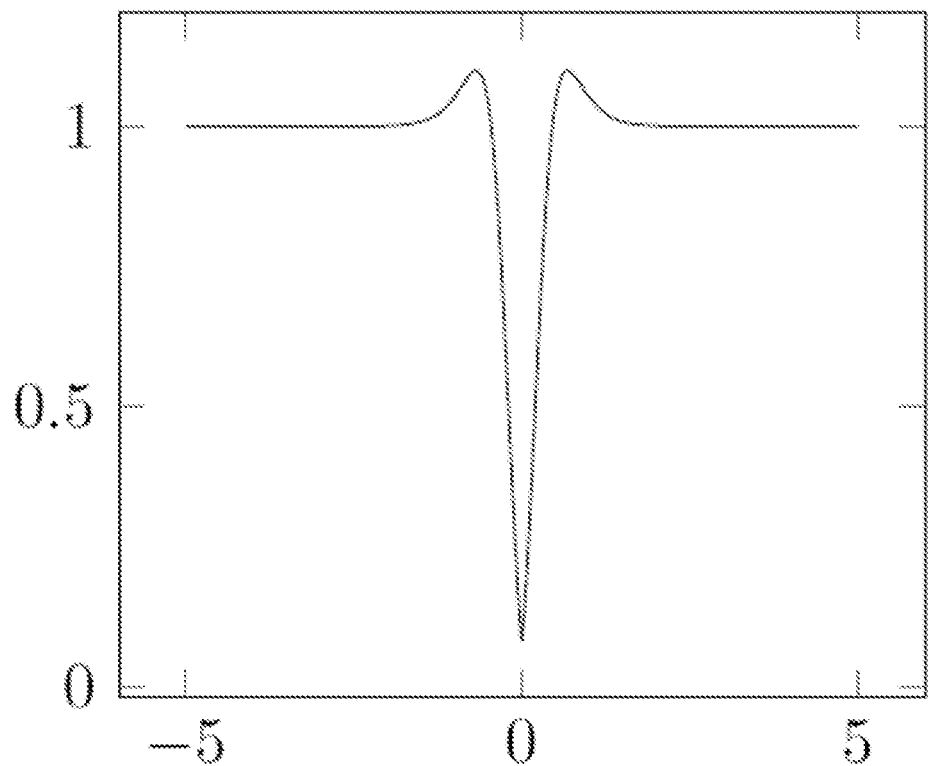
FIG. 4A graphically represents a differentiable mask function approximating the mask function of FIG. 3A in a two dimensional coordinate plot.
Figure 4B:
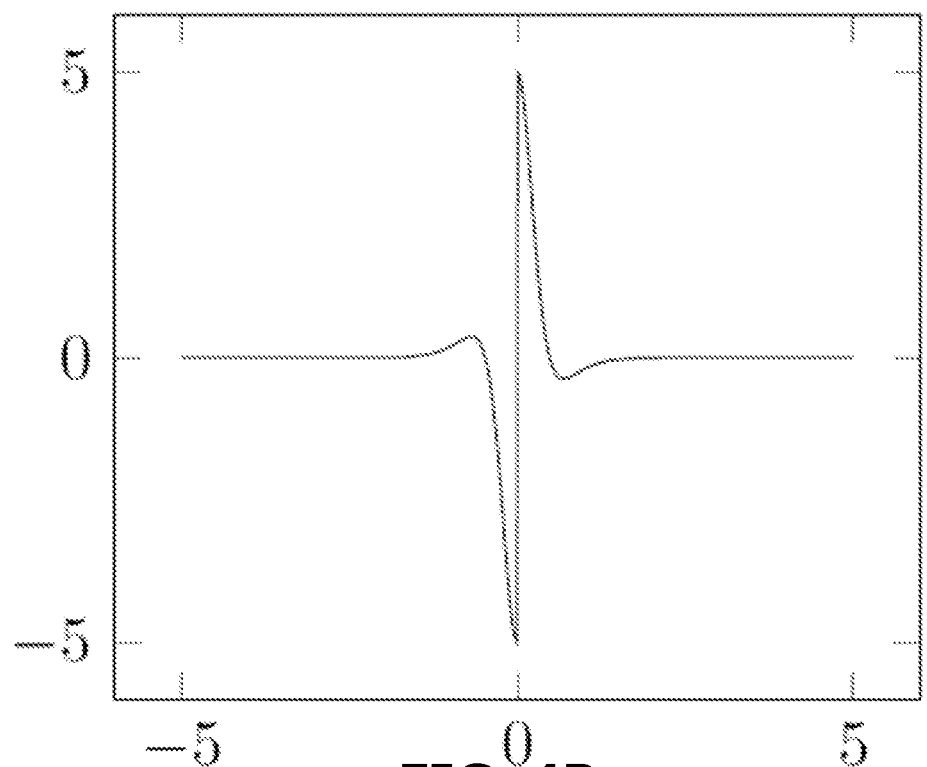
FIG. 4B graphically represents derivatives of the differentiable mask function of FIG. 4A.

FIG. 4A presents a graph of the differentiable mask function (9), and FIG. 4B shows derivatives of the differentiable mask function (9). With reference to FIGS. 4A and 4B, as the differentiable mask function (9) is smoother than the mask function (7), the derivatives of the differentiable mask function (9) are used for backpropagation to provide better gradient flows of the loss function. Using the differentiable mask function (9), rather than the mask function (7), to computes derivatives for backward pass may help to improve performance when compared to a simple Straight Through Estimator (STE), whose gradient is a constant (e.g., 1) at any point throughout horizontal axis. In some examples, the differentiable mask function may be a first derivative of a foothill function as described in Belbahri et al., 2019 (full citation provided below).

It should be understood that the differentiable mask function (9) substitutes for the non-differentiable mask function (7) when the NN block is performing backpropagation in the backward pass. In forward pass, the non-differentiable mask function (7) may be still used for the scaling operation 208 during forward pass.

In example embodiments, the pruning methods described herein are configured to substantially reduce a total number of weights included within the total weights of CNN 210 that includes the CNN block 200 when compared to a CNN that does not use pruning. Thus, such a method of applying a scaling operation 208 on an output of an activation operation by using a mask function may help to select filters that cause an output of the scaling operation to be zero, and prune weights of the selected filters accordingly, which may provide structured sparsity. The pruned weight matrix W can then be used to implement a trained NN that will require fewer computations and memory to perform predictions for a particular task the NN is trained for. In at least some implementations, during backpropagation, the mask function is replaced by a differential mask function, which may help to train each scaling factor $\alpha^j$ accurately. Furthermore, a first regularization function (L1) with respect to a respective scaling factor $\alpha^j$ is used in a loss function. The usage of the L1 regularization enables the scaling factor $\alpha^j$ to be trained to satisfy a criterion (e.g., the scaling factor $\alpha^j$ is within a range of −t to t, which approximates to 0), when the loss function achieves a minimum loss.

In some examples, the loss function L(w, $\alpha^j$) may further include a second regularization function (L2) that is configured to train weights to minimize loss of the loss function. The second regularization function (L2) is defined by equation (10).

$$L_2(\alpha^j, W) = \lambda_2 |I(\alpha^j)W|_2^2 \quad (10)$$

Where $\lambda_2$ is a parameter that controls importance of the L2 regularization function to the loss function. W represents the respective weights (e.g. Wj) of each filter Fj. I($\alpha^j$) is defined by the differentiable mask function (9). In some implementations, I($\alpha^j$) may be set to be a constant, which may help to learn weights primarily using the L2 regularization. Including the second regularization function L2 into the loss function may help to exclude weights that have already been pruned from the CNN 210 when the loss of the CNN 210 is being computed, which may ensure those weights that have been learned in backward pass to be used. Such a method may help the CNN 210 to how to learn weights in order to maintain stability of the CNN 210 in backward and forward passes during training.

In some implementations, the loss function associated of the NN 210 may further include a third regularization function (L3) that is configured to learn a current pruning ratio to approximate to a desired pruning ratio. The desired ratio may be pre-determined or pre-configured.

The third regularization function is defined by equation (11):

$$L_3(\alpha) = \lambda_3 * D(\alpha) = \lambda_3 * \left(\Sigma_{l=1:n}\left(\frac{(C_{li} * I(\alpha_l) * C_{lo} * k_l * k_l * m_l * m_l)}{(C_{li} * C_{lo} * k_l * k_l * m_l * m_l)}\right) - PR\right)^2 \quad (11)$$

In the equation (11), D($\alpha$) represents a squared error between the current pruning ratio and the desired pruning ratio; PR represents the desired pruning ratio;

$$\left(\frac{(C_{li} * I(\alpha_l) * C_{lo} * k_l * k_l * m_l * m_l)}{(C_{li} * C_{lo} * k_l * k_l * m_l * m_l)}\right)$$

represents a current pruning ratio for a lth convolution operation associated with a filter; $C_{li}$ is an input of the lth convolution operation; $C_{lo}$ is an output of the lth convolution operation; $k_l$ is a kernel size that is size of the filter associated with the lth convolution operation; $m_l$ is a size of an activation operation; I($\alpha_l$) is a mask function used for scaling output from the lth convolution operation; n is the number of the convolution operations; $\lambda_3$ is a parameter that control importance of the L3 regularization function within the loss function.

In some alternative examples, the third regularization function L3 may be defined in equation (12):

$$L_3(\alpha) = \lambda_3 * \max(0, D(\alpha)) \quad (12)$$

Where D($\alpha$) in the function (11) is defined by equation (13)

$$D(\alpha) = \left(\Sigma_{l=1:n}\left(\frac{(C_{li} * I(\alpha_l) * C_{lo} * k_l * k_l * m_l * m_l)}{(C_{li} * C_{lo} * k_l * k_l * m_l * m_l)}\right) - PR\right) \quad (13)$$

In the equation (13), D(α) represents an actual difference between the current pruning ratio and the desired ratio instead of the squared error as represented in equation (11). Thus, only when the current pruning ratio is larger than the desired ratio will the third regularization $L_3(\alpha)$ be greater than 0 and thus impact the loss function (w, $\alpha^j$). If the current pruning ratio is less than or equal to the desired ratio, the third regularization $L_3(\alpha)$ is equal to 0, which has no impact on the loss function.

Incorporating a third regularization function into the loss function of the NN may enable a current pruning ratio (e.g., a ratio to prune filters and weights) to be pushed to be close to a desired pruning ratio. In some examples, the current pruning ratio may be trained based on hardware computation capacity used for performing a number of floating point operations per second in forward pass (e.g., performing convolution operations by using filters).

The loss function L(w, $\alpha^j$) of the CNN 210 may be therefore defined by equation (14):

$$L(w, \alpha^j) = CE(w, \alpha^j) + L_1(\alpha^j) + L_2(\alpha^j, W) + L_3(\alpha) \quad (14)$$
$$= CE(w, \alpha^j) + \lambda_1|\alpha^j|_1 + \lambda_2|T(\alpha^j)W|_2^2 + L_3(\alpha)$$

Where CE(w, $\alpha^j$) represents a cross entropy function which measures divergence between two probability distributions (e.g., weights w and a scaling factor $\alpha^j$); $\Delta_1|\alpha^j|_1$ represents the L1 regularization function used to learn or update the value of al to minimize loss of the loss function; $\Delta_2|I(\alpha^j)W|_2^2$ represents the L2 regularization function used to learn the value of weights w to minimize loss; $L_3(\alpha)$ represents the L3 regularization function used to learn a current pruning ratio to enable the trained current pruning ratio to be pushed to a desired pruning ratio. In some examples, $\Delta_1=10^{-4}$, $\Delta_2=10^{-4}$, $\Delta_3=10^{-1}$, which may be computed by Bayesian optimization algorithms.

Figure 5:
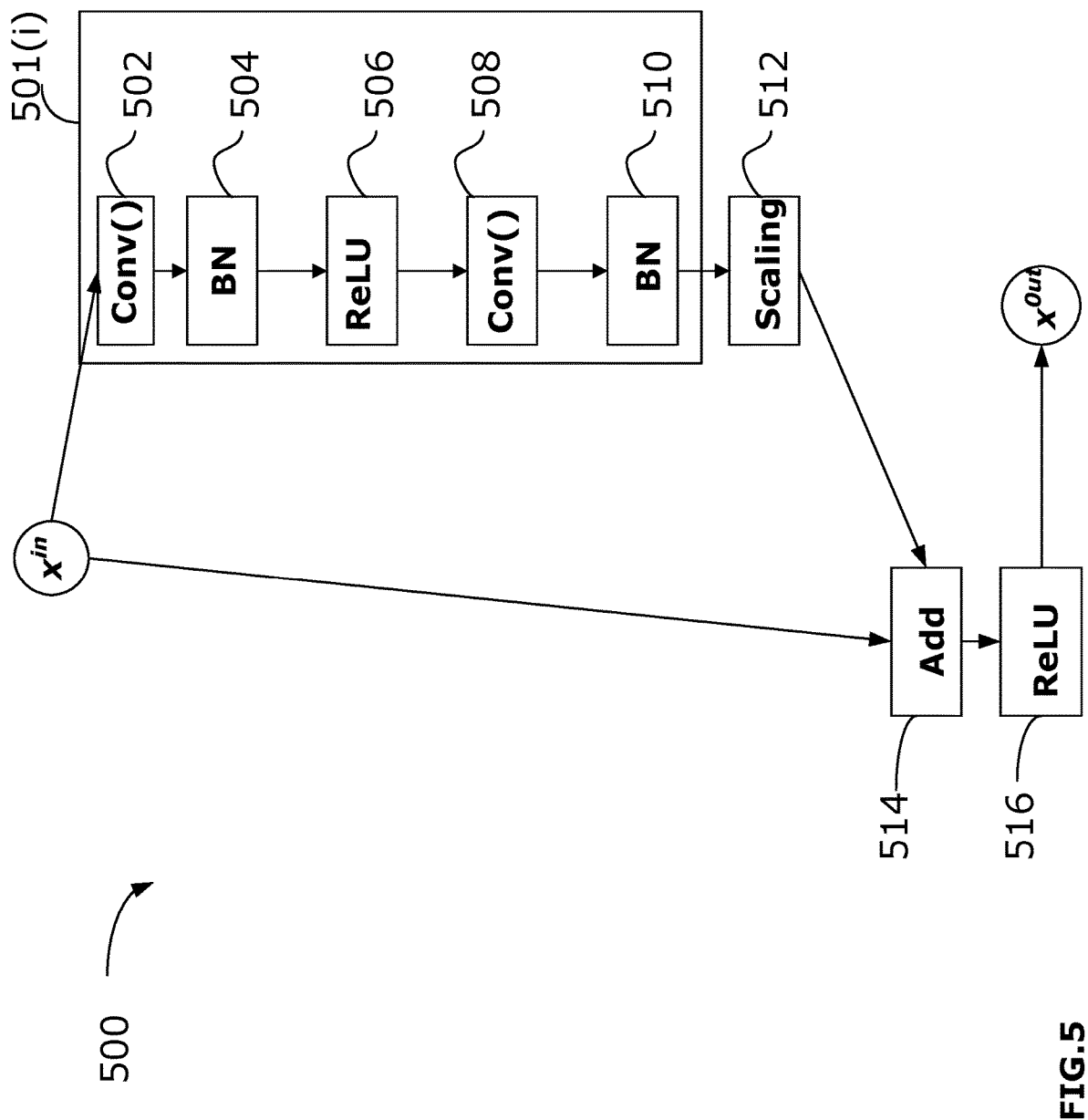
FIG. 5 is a computational graph representation of an NN block according to a further example embodiment.

The above embodiments describe filter pruning within a CNN block or layer. In some example embodiments, entire sub-networks that include one or more blocks may be pruned from a NN, such as for example a residual network (ResNet) style CNN. In this regard, FIG. 5 presents a schematic diagram of a ResNet style NN 500 comprising m layers or blocks. An $b^{th}$ NN sub-network 501(i) that includes one or more blocks is selected from a plurality of NN sub-networks to be pruned in accordance with an example embodiment. In the following discussion, determination whether the CNN sub-network 501(b) is selected to be pruned will be described. Sub-network 501(b) as shown in FIG. 5 is an i th sub-network layer in a deep learning system including a plurality of sub-network layers, and the output of the i th NN sub-network layer (e.g. sub-network 501(i)) of FIG. 5 can be mathematically represented by equation (15):

$$x^{i+1}=\text{Output}=\text{ReLU}(I(\alpha^k)*\alpha^{k}*\text{BatchNorm}(\text{Conv}(\text{ReLU}(\text{BatchNorm}(\text{Conv}(W^ix^i))))+x^i) \quad (15)$$

Where $\alpha^k$ and $I(\alpha^k)$ are similar to the counterparts $\alpha^j$ and $I(\alpha^j)$ of the equation (6) discussed above except that the scaling factor $\alpha^k$ (k=1 ... nc) used herein corresponds to a NN sub-network (e.g., the NN sub-network 501(i)); In some examples, $\alpha^k$ may be an integer; the indication function $I(\alpha^k)$ is a function whose value is determined by the scaling factor $\alpha^k$ corresponding to a respective NN sub-network 501(i). The two Conv(.) functions of the equation (15) represent a similar function to the Conv(.) operation 202 of CNN block 200 and are performed by the convolution operations 502 and 508 as shown in FIG. 5 respectively; Likewise, the two BatchNorm(.) functions and the two ReLU(.) (activation) functions are similar to the counterparts disclosed in the example of FIG. 2A and are implemented by the BN operations 504 and 510 and the activation operations 506 and 516 respectively.

The scaling factor $\alpha^1$ and the indication function (mask function) $I(\alpha^1)$ are used in the scaling operation 512 to determine whether the NN sub-network 501(1) is selected to be pruned. In this example, the NN sub-network 501(i) includes two convolution operations 502 and 508, two BN operations 504 and 510, and a ReLU operation 506. Each convolution operation 502 is associated with at least one filter and each filter includes a plurality of weights. In other examples, each NN sub-network 501 may include different respective configurations, for example including different numbers of convolution operations, BN operations, or any other suitable configurations based on computation requirement of the NN 500. In some examples, the NN sub-network 501 may include the NN block 200 as illustrated in FIG. 2A.

When the NN 500 is being trained, the scaling factor $\alpha^k$ is learned or updated to have a value to enable the indication function $i(\alpha^k)$ to be zero, the component $I(\alpha^k)*\alpha^{k}*\text{BatchNorm}(\text{Conv}(\text{ReLU}(\text{BatchNorm}(\text{Conv}(W^ix^i))))$ then is equal to zero. Therefore, the output of the i th NN of FIG. 5 can be represented by equation (16):

$$x^{i+1}=\text{Output}=\text{ReLU}(x^i) \quad (16)$$

Therefore, the entire NN sub-network 501(i) may be pruned from the layer 520 of NN 500. Performing a scaling operation on the output of an NN sub-network by using an indication function may help to determine whether the NN sub-network associated with the scaling operation will be selected to be pruned, which may enable sparsity to be introduced into a NN structurally without penalizing computation accuracy of the NN.

In some example embodiments, the NN block and/or the NN as described herein may be bit-wise related, which means that the NN block is a bit-wise NN block and the NN is a bit-wise NN. In that case, the input vector $x^i$ and the weight matrix $W^i$ may be binary values. Such a method to apply quantized input vectors and quantized weight matrices in the NN for pruning the quantized weight matrices provides more flexibility to save computation cost in resource constrained environments, which may boost computation accuracy as well when performing inference tasks.

In some examples, the NN structures discussed herein for pruning may be utilized in various applications, for example including facial recognition and object detection.

FIGS. 6A-6D are examples of pseudo codes representing different respective operations as discussed in the examples above. FIG. 6A demonstrates pseudo codes defining the mask function $I(a^j)$ which is denoted by the equation (7) during forward pass and is approximated to a differentiable mask function during backward pass. FIG. 6B shows pseudo codes used to perform the scaling operation that is mathematically denoted by the equation (6). It is noted that during the forward pass, prior performing the scaling operation, the scaling factor $\alpha^j$ is initialized as a vector parameter whose size is equal to the number of filters and each value is 1. FIG. 6C presents pseudo codes defining the loss function as represented by the equation (14). FIG. 6D shows pseudo codes used to define a basic NN block, such as the NN block 200 as shown in FIG. 2, or a NN, such as the NN 500 as shown in FIG. 5.

Figure 7:
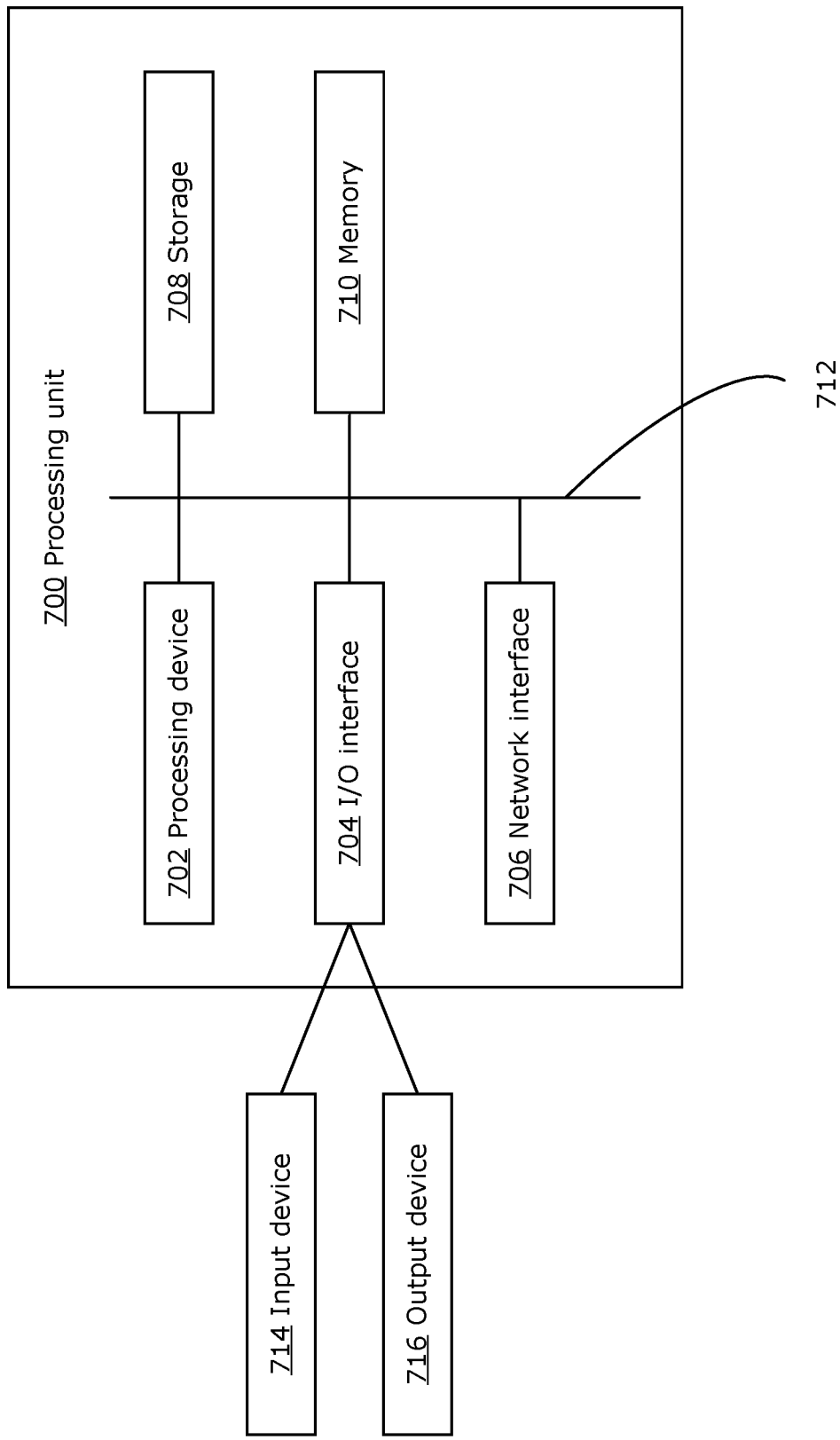
FIG. 7 is a block diagram illustrating an example processing system that may be used to execute machine readable instructions of an artificial neural network that includes the NN block of FIG. 2 and/or the NN block of FIG. 5.

FIG. 7 is a block diagram of an example simplified processing unit 700, which may be used to execute machine executable instructions of an artificial neural network to perform a specific task) based on software implementations. The artificial neural network may include one or more layers each implemented using respective operations of the NN block 200 and the NN 500 for pruning filters, weights, and/or blocks. Other processing units suitable for implementing embodiments described in the present disclosure may be used, which may include components different from those discussed below. Although FIG. 7 shows a single instance of each component, there may be multiple instances of each component in the processing unit 700.

The processing unit 700 may include one or more processing devices 702, such as a processor, a microprocessor, an application-specific integrated circuit (ASIC), a field-programmable gate array (FPGA), a dedicated logic circuitry, or combinations thereof. The processing unit 700 may also include one or more input/output (I/O) interfaces 704, which may enable interfacing with one or more appropriate input devices 714 and/or output devices 716. The processing unit 700 may include one or more network interfaces 706 for wired or wireless communication with a network (e.g., an intranet, the Internet, a P2P network, a WAN and/or a LAN) or other node. The network interfaces 706 may include wired links (e.g., Ethernet cable) and/or wireless links (e.g., one or more antennas) for intra-network and/or inter-network communications.

The processing unit 700 may also include one or more storage units 708, which may include a mass storage unit such as a solid state drive, a hard disk drive, a magnetic disk drive and/or an optical disk drive. The processing unit 700 may include one or more memories 710, which may include a volatile or non-volatile memory (e.g., a flash memory, a random access memory (RAM), and/or a read-only memory (ROM)). The non-transitory memory(ies) 710 may store instructions for execution by the processing device(s) 702, such as to carry out examples described in the present disclosure. The memory(ies) 710 may include other software instructions, such as for implementing an operating system and other applications/functions. In some examples, memory 710 may include software instructions for execution by the processing device 702 to implement a neural network that includes NN block 200 and/or NN block 500 of the present disclosure. In some examples, the equations (1)-(16) and different kinds of algorithms (e.g., gradient optimization algorithms, quantization algorithms, etc.,) may be stored within the memory 710 along with the different respective parameters discussed in the equations (1)-(16). The processing device may execute machine executable instructions to perform each operation of the NN block 200 and/or NN block 500 as disclosed herein, such as convolution operation, BN operation, activation operation, and scaling operations using the equations (1)-(16) stored within the memory 710. In some other examples, one or more data sets and/or modules may be provided by an external memory (e.g., an external drive in wired or wireless communication with the processing unit 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 712 providing communication among components of the processing unit 700, including the processing device(s) 702, I/O interface(s) 704, network interface(s) 706, storage unit(s) 708 and/or memory(ies) 710. The bus 712 may be any suitable bus architecture including, for example, a memory bus, a peripheral bus or a video bus.

As shown in FIG. 7, the input device(s) 714 (e.g., a keyboard, a mouse, a microphone, a touchscreen, and/or a keypad) and output device(s) 716 (e.g., a display, a speaker and/or a printer) are shown as external to the processing unit 700. In other examples, one or more of the input device(s) 714 and/or the output device(s) 716 may be included as a component of the processing unit 700. In other examples, there may not be any input device(s) 714 and output device(s) 716, in which case the I/O interface(s) 704 may not be needed.

It will thus be appreciated that the NN block 200 described herein for pruning filters thereof may be applied for performing inference tasks in various scenarios. For example, NN block 200 or NN 500 can be useful for a deep neural network system that is deployed into edge devices like robotic, drone, camera and IoT sensor devices, among other things.

In some examples, a NN system (e.g., deep neural network system) may implement a NN (e.g., NN 500) and/or a NN block (e.g., NN block 200) including one or more layers each performing a respective operation. The NN may be a software that includes machine readable instructions that may be executed using a processing unit, such as a neural processing unit. Alternatively, the NN may be a software that includes machine readable instructions that be executed by a dedicated hardware device, such as a compact, energy efficient AI chip that includes a small number of logical gates.

The present disclosure provides examples in which filters associated with a convolution operation are selected to be pruned from a NN block by performing scaling operation (e.g., using a mask function) on an output of an activation operation, which may enable sparsity introduced into a NN including the NN block to be structural and may lower computational power significantly. The scaling operation applies a scaling factor that is learnable in backward pass, which may enable filters (e.g., including a plurality of weights) to be pruned during training of the NN instead of in post-training process. In some examples, the scaling factor is learned in backward pass to ensure a loss function including a first regularization function with respect to the scaling factor to have minimum loss. In the meanwhile, if a scaling factor learned to cause the loss function to have minimum loss also enables the mask function to be zero, a filter corresponding to the learned scaling factor is selected to be pruned from a NN block.

The present disclosure further illustrates example NN block in which the mask function is replaced by a differentiable mask function to compute gradients of the loss function. This may help enable loss of the loss function to be more accurate.

In some examples, a second regularization function with respect to weights of a filter is included in the loss function. Incorporation the second regularization function in the loss function may help to improve accuracy of the NN.

In some examples, a third regularization function with respect to a current pruning ratio is included in the loss function, which may help to push the current pruning ratio to a desired pruning ratio in backward pass.

In some examples, a quantization algorithm may be used in a NN block or a NN for pruning in which inputs and weights of the filters are binary. Such a method to integrate scaling operation with quantization may help to save computational cost, such as computational power, significantly.

In some examples, an entire NN block may be selected to be pruned from a NN if a scaling factor associated with the NN block enable a scaling operation on an output of the NN block to be zero, which may help to perform block pruning efficiently and improve structural sparsity.

In some implementations, the NN block or the NN of the present disclosure may be trained to perform inference tasks in various applications. The inferences tasks may include facial recognition, object detections, image classification, machine translation, or text-to-speech transition.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, as listed below.
Han Song [et al.] Learning both Weights and Connections for Efficient Neural Networks [Journal]//CoRR.—2015.—Vol. abs/1506.02626.
Liu Zhuang [et al.] Learning Efficient Convolutional Networks through Network Slimming [Journal]//CoRR.—2017.—Vol. abs/1708.06519.
Cheng Yu [et al.] A Survey of Model Compression and Acceleration for Deep Neural Networks [Journal]//arXiv preprint arXiv:1710.09282.—2017.
Belbahri Mouloud, et al "Foothill: A Quasiconvex Regularization Function. [Book].—[s.I.]: arXiv preprint arXiv: 1901.06414, 2019.

The invention claimed is:
1. A method of selective pruning of a neural network (NN) during training of the NN,
  wherein the NN is implemented by operations including:
    a convolution operation convolving an input feature map with each of a plurality of filters, each filter including a respective plurality of weights, to generate a plurality of filter outputs each corresponding to a respective filter;
    an activation operation generating, for each of the filter outputs, a respective non-linearized output;
    a scaling operation scaling the non-linearized output generated in respect of each filter by multiplying the non-linearized output with a mask function and a respective scaling factor that corresponds to the filter;
  wherein the method of selective pruning comprises:
    for each scaling factor corresponding to a filter, learning the scaling factor by minimizing loss of a loss function that includes a first regularization function for the scaling factor; and
    when a value of the scaling factor satisfies a criterion, selectively pruning the filter corresponding to the scaling factor by masking the filter from the convolution operation,
  wherein during backpropagation a differentiable function approximating the mask function is used to compute gradients of the loss function for updating the scaling factor during training.

2. The method of claim 1 wherein for each scaling factor corresponding to a filter, the loss function includes a second regularization function with respect to weights of the filter; and
  during backpropagation, the second regularization function is configured to learn the weights to enable the loss function to be minimized.

3. The method of claim 2 wherein the loss function includes a third regularization function with respect to a current pruning ratio; and
  during backpropagation, the third regularization function is configured to learn the current pruning ratio to approximate to a desired pruning ratio to enable the loss function to be minimized.

4. The method of claim 3 wherein each of the first, second and third regularization functions includes a respective hyperparameter that controls a respective influence of the regularization parameter on the loss function.

5. The method of claim 1 wherein the criterion includes an absolute value of the trained scaling factor being less than or equal to a threshold.

6. The method of claim 1 wherein the plurality of filter outputs corresponding to each respective filter collectively form an activation map that corresponds to an output channel of the convolution operation.

7. The method of claim 1 comprising outputting, at the end of the training, a set of weights for the convolution operation that excludes the weights of the pruned filters for use by an inference NN that does not include a scaling operation.

8. The method of claim 1 where the convolution operation corresponds to a layer of a convolution NN.

9. A method of selective pruning of a neural network (NN) during training of the NN,
  wherein the NN is implemented by operations including:
    a convolution operation convolving an input feature map with each of a plurality of filters, each filter including a respective plurality of weights, to generate a plurality of filter outputs each corresponding to a respective filter;

an activation operation generating, for each of the filter outputs, a respective non-linearized output;

a scaling operation scaling the non-linearized output generated in respect of each filter by multiplying the non-linearized output with a mask function and a respective scaling factor that corresponds to the filter;

wherein the method of selective pruning comprises:

for each scaling factor corresponding to a filter, learning the scaling factor by minimizing loss of a loss function that includes a first regularization function for the scaling factor; and when a value of the scaling factor satisfies a criterion, selectively pruning the filter corresponding to the scaling factor by masking the filter from the convolution operation, wherein the mask function is an indication function that is equal to 0 when the scaling factor is outside of a threshold range and 1 when the scaling factor is within a threshold range.

10. A system that includes a processing device and a non-transitory memory or storage storing instructions that configure the processing device to learn parameters for a neural network (NN) that is implemented by operations including: a convolution operation convolving an input feature map with each of a plurality of filters, each filter including a respective plurality of weights, to generate a plurality of filter outputs each corresponding to a respective filter; an activation operation generating, for each of the filter outputs, a respective non-linearized output; and a scaling the non-linearized output generated in respect of each filter by multiplying the non-linearized output with a mask function and a respective scaling factor that corresponds to the filter;

wherein the instructions when executed cause the processing device to:

for each scaling factor corresponding to a filter, learn the scaling factor by minimizing loss of a loss function that includes a first regularization function for the scaling factor; and when a value of the scaling factor satisfies a criterion, selectively prune the filter corresponding to the scaling factor by masking the filter from the convolution operation, and wherein the instructions configure the processing device to perform backpropagation during which a differentiable function approximating the mask function is used to compute gradients of the loss function for updating the scaling factor during training.

11. The system of claim 10 wherein for each scaling factor corresponding to a filter, the loss function includes a second regularization function with respect to weights of the filter; and during the backpropagation, the second regularization function is configured to learn the weights to enable the loss function to be minimized.

12. The system of claim 11 wherein the loss function includes a third regularization function with respect to a current pruning ratio; and during the backpropagation, the third regularization function is configured to learn the current pruning ratio to approximate to a desired pruning ratio to enable the loss function to be minimized.

13. The system of claim 12 wherein each of the first, second and third regularization functions includes a respective hyperparameter that controls a respective influence of the regularization parameter on the loss function.

14. The system of claim 10 wherein the criterion includes an absolute value of the trained scaling factor being less than or equal to a threshold.

15. The system of claim 10 wherein the plurality of filter outputs corresponding to each respective filter collectively form an activation map that corresponds to an output channel of the convolution operation.

16. A system that includes a processing device and a non-transitory memory or storage storing instructions that configure the processing device to learn parameters for a neural network (NN) that is implemented by operations including: a convolution operation convolving an input feature map with each of a plurality of filters, each filter including a respective plurality of weights, to generate a plurality of filter outputs each corresponding to a respective filter; an activation operation generating, for each of the filter outputs, a respective non-linearized output; and a scaling operation scaling the non-linearized output generated in respect of each filter by multiplying the non-linearized output with a mask function and a respective scaling factor that corresponds to the filter;

wherein the instructions configure the processing device to:

for each scaling factor corresponding to a filter, learn the scaling factor by minimizing loss of a loss function that includes a first regularization function for the scaling factor; and when a value of the scaling factor satisfies a criterion, selectively prune the filter corresponding to the scaling factor by masking the filter from the convolution operation, wherein the mask function is an indication function that is equal to 0 when the scaling factor is outside of a threshold range and 1 when the scaling factor is within a threshold range.

17. A non-transitory computer readable memory that stores instructions that configure a processing device to learn parameters for a neural network (NN) that by operations including: a convolution operation convolving an input feature map with each of a plurality of filters, each filter including a respective plurality of weights, to generate a plurality of filter outputs each corresponding to a respective filter; an activation operation generating, for each of the filter outputs, a respective non-linearized output; and a scaling operation scaling the non-linearized output generated in respect of each filter by multiplying the non-linearized output with a mask function and a respective scaling factor that corresponds to the filter;

wherein the instructions include instructions that configure the processing device to:

for each scaling factor corresponding to a filter, learn the scaling factor by minimizing loss of a loss function that includes a first regularization function for the scaling factor; and when a value of the scaling factor satisfies a criterion, selectively prune the filter corresponding to the scaling factor by masking the filter from the convolution operation, and wherein the mask function is an indication function that is equal to 0 when the scaling factor is outside of a threshold range and 1 when the scaling factor is within a threshold range.

* * * * *

UNITED STATES PATENT AND TRADEMARK OFFICE
CERTIFICATE OF CORRECTION

PATENT NO. : 12,039,448 B2
APPLICATION NO. : 17/012818
DATED : July 16, 2024
INVENTOR(S) : Vahid Partovi Nia, Ramchalam Kinattinkara Ramakrishnan and Eyyüb Hachmie Sari It is certified that error appears in the above-identified patent and that said Letters Patent is hereby corrected as shown below:

In the Specification

In Column 9, Line 11, both occurrences of "cony" should read -- conv --.

In Column 13, Lines 20-25, Equation 14 should read as follows:

$$L(w, \alpha^j) = CE(w, \alpha^j) + L_1(\alpha^j) + L_2(\alpha^j, W) + L_3(\alpha)$$

$$= CE(w, \alpha^j) + \lambda_1 |\alpha^j|_1 + \lambda_2 |I(\alpha^j)W|_2^2 + L_3(\alpha)$$

In Column 13, Line 36 "examples, $\Delta_1=10^{-4}$, $\Delta_2=10^{-4}$, $\Delta_3=10^{-1}$, which may be com-" should read -- examples, $\lambda_1 = 10^{-4}$, $\lambda_2 = 10^{-4}$, $\lambda_3 = 10^{-1}$, which may be com- --.

Signed and Sealed this
Twenty-second Day of October, 2024

*Katherine Kelly Vidal*
Katherine Kelly Vidal
*Director of the United States Patent and Trademark Office*